(12) United States Patent
Kaizu et al.

(10) Patent No.: US 8,132,209 B2
(45) Date of Patent: Mar. 6, 2012

(54) INFORMATION PROCESSING DEVICE

(75) Inventors: Tatsuo Kaizu, Tokyo (JP); Takuma Miyazaki, Tokyo (JP); Hiroyuki Hanaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1585 days.

(21) Appl. No.: 10/398,516

(22) PCT Filed: Oct. 5, 2001

(86) PCT No.: PCT/JP01/08811
§ 371 (c)(1),
(2), (4) Date: Apr. 4, 2003

(87) PCT Pub. No.: WO02/32125
PCT Pub. Date: Apr. 18, 2002

(65) Prior Publication Data
US 2004/0015989 A1    Jan. 22, 2004

(30) Foreign Application Priority Data

Oct. 6, 2000  (JP) .................................. 2000-307084

(51) Int. Cl.
*H04N 5/445*    (2011.01)

(52) U.S. Cl. ................ 725/51; 725/42; 725/46; 725/61; 725/110; 725/132

(58) Field of Classification Search .................... 725/51, 725/42, 46, 91, 61, 110, 132
See application file for complete search history.

(56) References Cited

U.S. PATENT DOCUMENTS

| | | | |
|---|---|---|---|
| 6,081,693 A | 6/2000 | Wicks | |
| 6,374,406 B2 * | 4/2002 | Hirata | 725/132 |
| 6,446,082 B1 * | 9/2002 | Arita | 709/203 |
| 6,470,496 B1 * | 10/2002 | Kato et al. | 717/173 |
| 6,965,921 B2 * | 11/2005 | Lu et al. | 709/206 |
| 6,968,364 B1 * | 11/2005 | Wong et al. | 709/217 |
| 6,996,387 B2 * | 2/2006 | Chan | 455/301 |
| 7,088,952 B1 * | 8/2006 | Saito et al. | 455/3.06 |
| 7,444,382 B2 * | 10/2008 | Malik | 709/206 |
| 7,548,565 B2 * | 6/2009 | Sull et al. | 370/503 |

(Continued)

FOREIGN PATENT DOCUMENTS
DE    197 40 079 A1    3/1999
(Continued)

*Primary Examiner* — Joseph P Hirl
*Assistant Examiner* — Jivka Rabovianski
(74) *Attorney, Agent, or Firm* — Oblon, Spivak, McClelland, Maier & Neustadt, L.L.P.

(57) ABSTRACT

This invention relates to an information processing apparatus for allowing a user at a remote location to make easy and quick reservation of a TV program for unattended recording over a network. In step S103, the user accesses an EPG server to get an HTML-based TV program information screen displayed on the user's camera-equipped digital mobile telephone and reserves through the screen a desired program for unattended recording. In response, a main control unit of the telephone requests the EPG server to attach recording reservation data about the program reserved by the user to an e-mail and to send the e-mail to the user's personal computer along with the attachment. Given the send request, the EPG server retrieves the recording reservation data from an EPG information database in step S112, and attaches the retrieved data to an e-mail via the internet before sending the e-mail to the personal computer in step S113, the personal computer being located remotely such as in the user's home.

15 Claims, 36 Drawing Sheets

U.S. PATENT DOCUMENTS

| | | | |
|---|---|---|---|
| 2001/0013122 A1 | 8/2001 | Hirata | |
| 2002/0016829 A1* | 2/2002 | Defosse | 709/217 |
| 2002/0026636 A1* | 2/2002 | LeComte | 725/31 |
| 2002/0028063 A1* | 3/2002 | Haneda et al. | 386/83 |
| 2002/0059637 A1* | 5/2002 | Rakib | 725/119 |
| 2002/0077083 A1* | 6/2002 | Zellner et al. | 455/414 |
| 2002/0077084 A1* | 6/2002 | Zellner et al. | 455/414 |
| 2002/0077897 A1* | 6/2002 | Zellner et al. | 705/14 |
| 2002/0107041 A1* | 8/2002 | Mori | 455/527 |
| 2002/0128036 A1* | 9/2002 | Yach et al. | 455/552 |
| 2003/0009583 A1* | 1/2003 | Chan et al. | 709/236 |
| 2003/0154256 A1* | 8/2003 | Hadano et al. | 709/206 |
| 2004/0237079 A1* | 11/2004 | Cox et al. | 717/168 |
| 2005/0044423 A1* | 2/2005 | Mellmer et al. | 713/201 |
| 2005/0048958 A1* | 3/2005 | Mousseau et al. | 455/415 |
| 2005/0055685 A1* | 3/2005 | Maynard et al. | 717/170 |
| 2006/0030335 A1* | 2/2006 | Zellner et al. | 455/456.1 |
| 2006/0064716 A1* | 3/2006 | Sull et al. | 725/37 |
| 2006/0105784 A1* | 5/2006 | Zellner et al. | 455/456.3 |
| 2006/0179121 A1* | 8/2006 | Kegoya et al. | 709/217 |
| 2006/0189327 A1* | 8/2006 | Zellner et al. | 455/456.1 |
| 2006/0218193 A1* | 9/2006 | Gopalakrishnan | 707/104.1 |

FOREIGN PATENT DOCUMENTS

| | | |
|---|---|---|
| JP | 9-93309 | 4/1997 |
| JP | 9-102827 | 4/1997 |
| JP | 10-155131 | 6/1998 |
| JP | 10-247345 | 9/1998 |
| JP | 10-257090 | 9/1998 |
| JP | 10-261251 | 9/1998 |
| JP | 10 261251 A | 9/1998 |
| JP | 2000-67488 | 3/2000 |
| WO | 00/04709 A | 1/2000 |

* cited by examiner

FIG. 1

NEW RESERVATION···SET THE TV CHANNEL AND THE START DATE AND TIME

SET THE CHANNEL AND THE START DATE AND TIME TO RESERVE THE PREFERRED TV PROGRAM FOR UNATTENDED RECORDING

CHANNEL [CH. 6, NIHON TV ▶]

START DATE [JUNE 2, 2000 ▶]

START TIME [19 HRS ▶] [00 MIN ▶]

[CANCEL] [NEXT] [HELP]

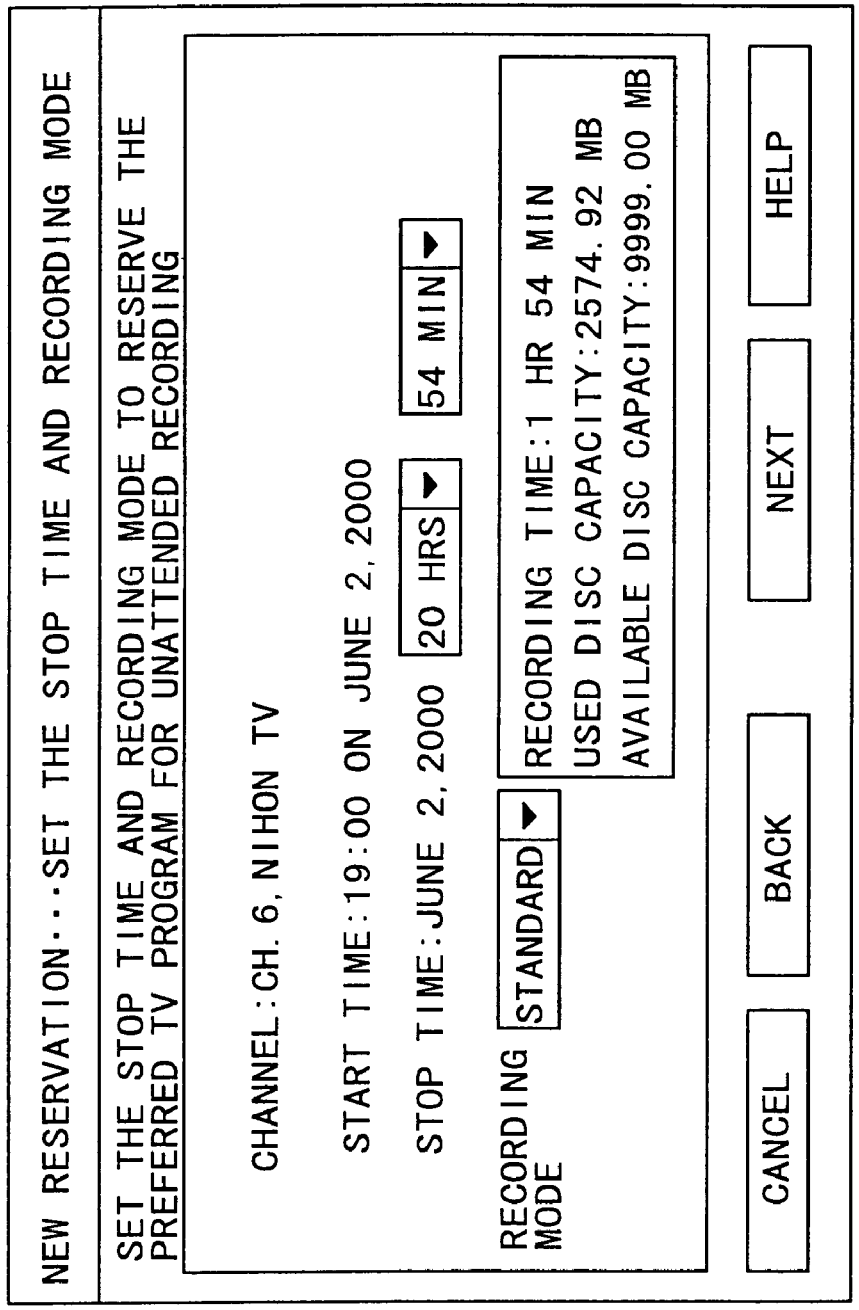

F I G. 3

NEW RESERVATION···CONFIRM THE SETTINGS

UNATTENDED RECORDING HAS BEEN RESERVED WITH THE SETTINGS BELOW. PLEASE CONFIRM THAT THEY ARE ACCURATE.

START TIME: 19:00 ON JUNE 2, 2000
STOP TIME: 20:54 ON JUNE 2, 2000
CHANNEL: CH.6, NIHON TV
RECORDING MODE: STANDARD
PERIODICAL RESERVATION: ONCE
EXPIRATION DATE OF CONTENT: NONE
CONTENT NAME: PROFESSIONAL BASEBALL
STORAGE LIBRARY: TEMPORARY STORAGE
MEMO:

| CANCEL | BACK | COMPLETE | HELP |

REGION SELECTION

[1] HOKKAIDO

[2] KANTO

[3] CHUBU

[4] KANSAI

[5] FUKUOKA

[BACK]

F I G. 1 8
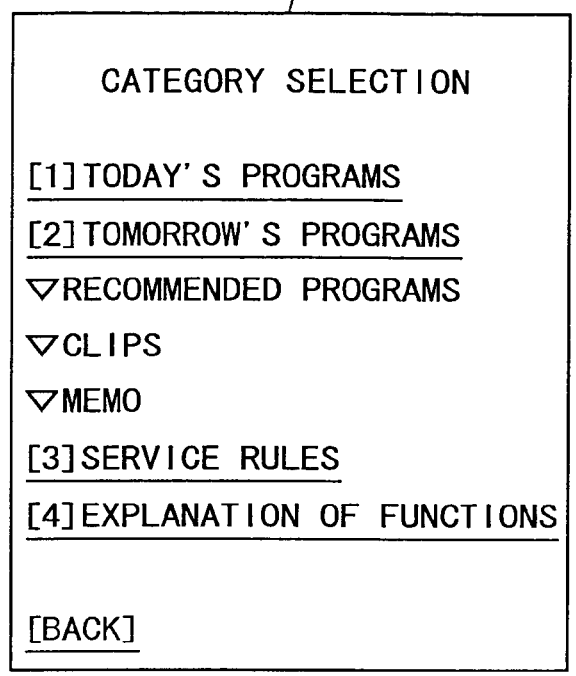
F I G. 1 9
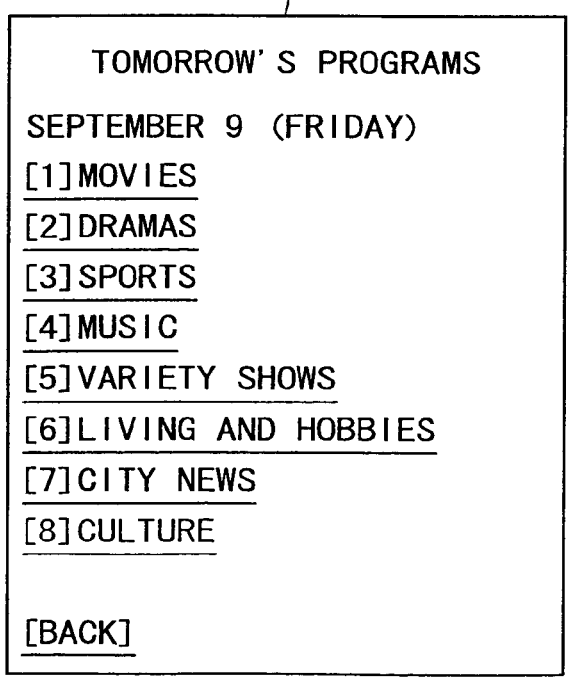

FIG. 20

TOMORROW'S PROGRAMS

SEPTEMBER 29
[1] OLYMPIC GAMES 07:55
[2] OLYMPIC GAMES 08:35
[3] NEWS 10:00
•
•
•
[10] PROFESSIONAL BASEBALL
19:00

[BACK]

FIG. 21

PROFESSIONAL BASEBALL

SEPTEMBER 29 (FRIDAY)
FROM 19:00 TO 20:54
ON NIHON TV
SPORTS: PROFESSIONAL
BASEBALL
▽YOMIURI GIANTS VS.
CHUNICHI DRAGONS AT
NAGOYA DOME, WITH PLAY-
BY-PLAY COMMENTARY BY
TOSHU MOTODAI AND SABURO
ARATATE

[BACK]

RESERVE BY iEPG

FIG. 22

```
Subject: TVPI20000602I900
Content-type: application/x-tv-program-info;charset=shift_jis
version: 1
station: NIHON TV
year: 2000
month: 06
date: 02
start: 19:00
end: 20:54
program-title: PROFESSIONAL BASEBALL -YOMIURI GIANTS VS. CHUNICHI DRAGONS AT NAGOYA DOME, WITH
PLAY-BY-PLAY COMMENTARY BY TOSHU MOTODAI AND SABURO ARATATE
(THE BROADCAST OF THE GAME COULD BE EXTENDED TO 21:24, THE
SUBSEQUENT PROGRAMS WILL THEN BE MOVED DOWN.)

FOLLOWING THE SCUFFLES IN THE PRECEDING GAME WITH THE
YOKOHAMA BAY STARS, TEAM LEADER TACHIKAWA PULLED HIMSELF
TOGETHER TO FACE THE NEW CHALLENGE. THAT SEEMS TO HAVE PAID
OFF. HE HAS BEEN GETTING BETTER AT BAT, STIMULATING HIS
TEAMMATES TO DO MORE. TACHIKAWA IS EXPECTED TO PERFORM AS A
MAIN SCORER IN THE UPCOMING THREE GAMES WITH THE GIANTS.
```

RESERVATION COMPLETE
ANNOUNCEMENT MELODY

[1] Melody A
[2] Melody B
[3] Melody C
[4] Melody 1
[5] Melody 2
[6] Melody 3

[BACK]

FIG. 29

1, 0, 0, 1, NHK GENERAL, NHK GENERAL, NHK
3, 0, 0, 3, NHK EDUCATIONAL, NHK EDUCATIONAL, NHK2
4, 0, 0, 4, NIHON TV, NIHON TV, NITTELE, NIHON TV BROADCASTING NETWORK, NTV
5, 0, 0, 5, SCOPE, SCOPE
6, 0, 0, 6, TOKYO BROADCASTING, TOKYO BROADCASTING, TBS TV, TBS
8, 0, 0, 8, FUJI TV, FUJI TV, FUJI TELEVISION, CX, FUJI
7, 0, 0, 7, VAIO TV, VAIO TV, VAIO
9, 0, 0, 9, NHK BROADCAST BY SATELLITE 2, NHK BROADCAST BY SATELLITE 2, BS2, NHKBS2
10, 0, 0, 10, TV ASAHI, TV ASAHI, ZENKOKU ASAHI BROADCASTING, TV-ASAHI, TELE-ASA, ANB, TVASA
11, 0, 0, 11, NHK BROADCAST BY SATELLITE 1, NHK BROADCAST BY SATELLITE 1, BS1, NHKBS1
12, 0, 0, 12, TV TOKYO, TV TOKYO, TELE-TO, TVTOKYO, TX, TVTOK

FIG. 30

```
TO:foo@aa.doco.ne.jp
From:foo@aa.ne.com
Subject:VIDEO Reservation

THE RECORDING RESERVATION IS NOW
   COMPLETE.

RESERVATION NO. : 2
```

FIG. 31

```
TO:foo@aa.doco.ne.jp
From:foo@aa.ne.com
Subject:VIDEO Reservation

DATA FOR RESERVATION NO. 1 OVERLAP
   IN PART WITH EXISTING DATA ON
   RECORDING TIMES. RESERVATION IS
   IMPOSSIBLE.
```

FIG. 33

TO:foo@aa.doco.ne.jp
From:foo@aa.ne.com
Subject:VIDEO Reservation

THE RECORDING RESERVATION IS DELETED.

RESERVATION NO. : 2

FIG. 34

TO:foo@aa.doco.ne.jp
From:foo@aa.ne.com
Subject:VIDEO Reservation

RESERVATION NO.1 IS NOT FOUND AND THE RESERVATION DATA CANNOT BE DELETED.

F I G. 3 6
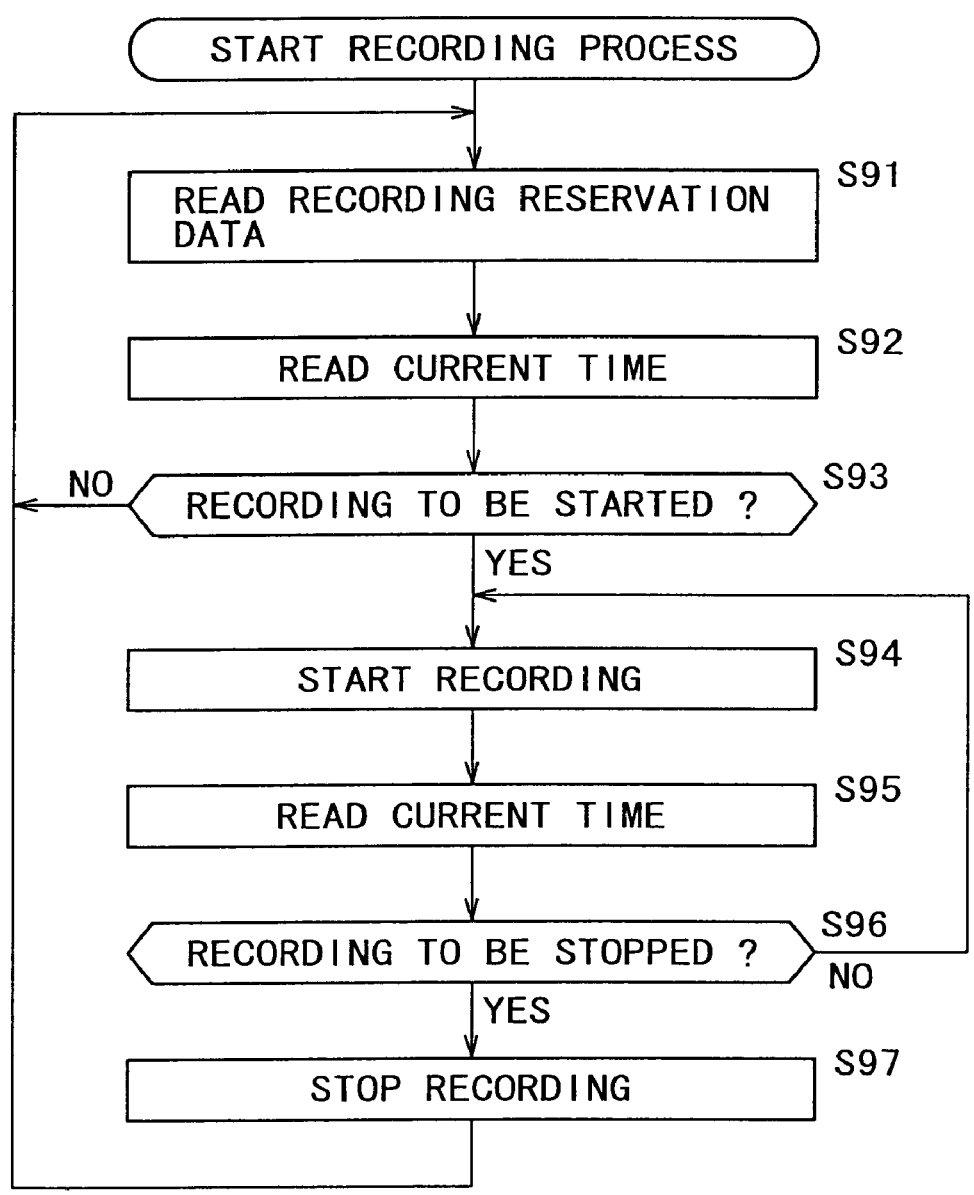

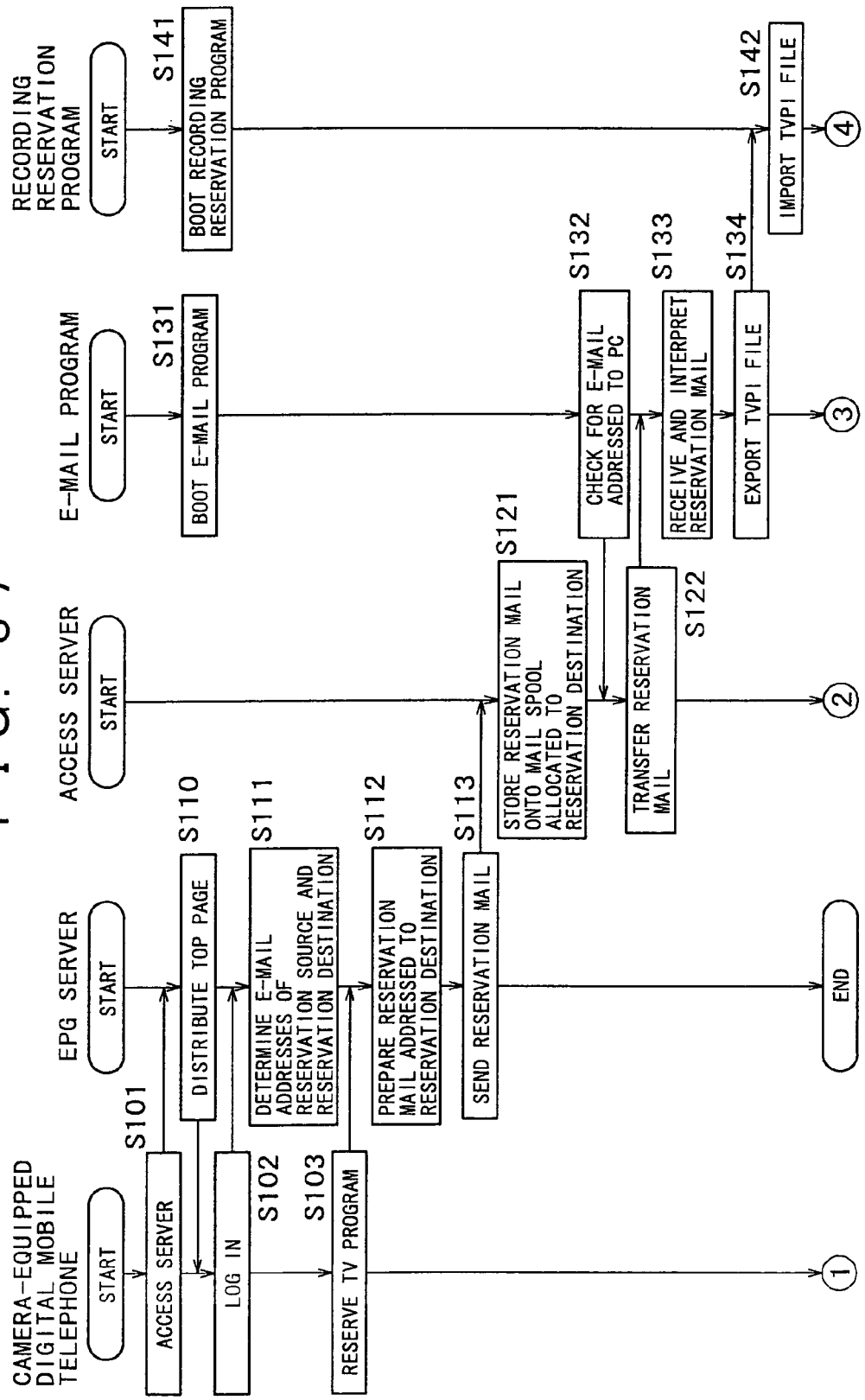

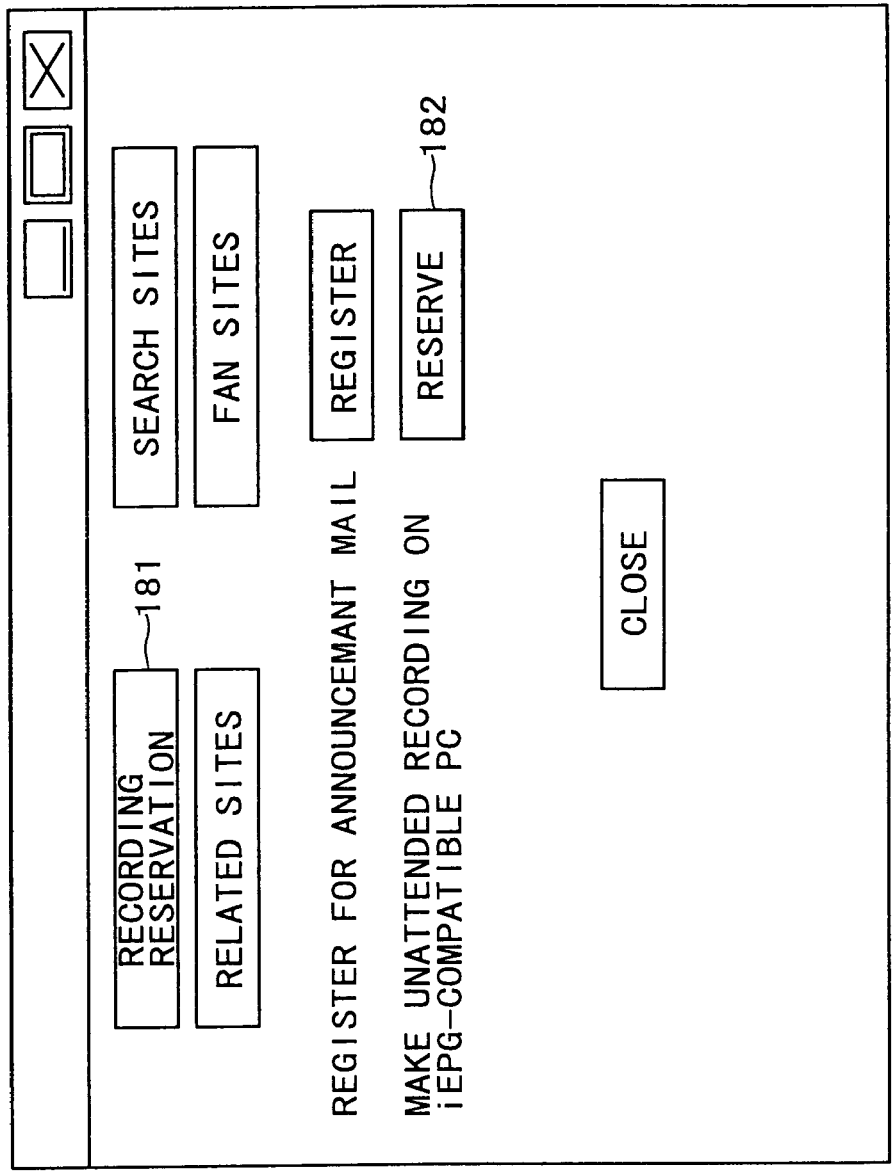

FIG. 40

BROADCAST PROGRAM INFORMATION

| | CH 1<br>NHK GENERAL | CH 3<br>NHK EDUCATIONAL | CH 4<br>NIHON TV | CH 6<br>TBS |
|---|---|---|---|---|
| 19 | 0 SEVEN O'CLOCK NEWS<br>▽TODAY'S NEWS<br>▽SPORTS NEWS<br>▽INFORMATION ON STOCKS AND FOREIGN EXCHANGES<br>▽WEATHER INFORMATION<br>NEWSCASTERS: 191-1 [R] 191-2 [R]<br>57 TV MAP | 0 EXTRACURRICULAR CLUB: "FRESHMAN, WELCOME!"<br>191-5 [R] 191-6 [R]<br>30 SHORT LESSONS IN SIGN LANGUAGE<br>45 YOUR HEALTH FOR TOMORROW 191-7 [R] | 0 PROFESSIONAL BASEBALL: YOMIURI GIANTS VS. CHUNICHI DRAGONS AT TOKYO DOME, WITH PLAY-BY-PLAY COMMENTARY BY TOSHU MOTODAI AND SABURO ARATATE<br>191-10 [R] | 0 FRIDAY TV DOCUMENTARY: "24 HOURS AT A HOSPITAL EMERGENCY ROOM"<br>191-11 [R] |
| 20 | 0 DRAMA: "NANTARA-KANTARA"<br>191-3 [R]<br>45 LOCAL WEATHER FORECASTS<br>191-4 [R] | 0 VARIETY: WITH YOU TONIGHT<br>191-8 [R]<br>30 LESSONS IN BRAILLE<br>191-9 [R] | | |

BACK

INFORMATION PROCESSING DEVICE

TECHNICAL FIELD

The present invention relates to an information processing apparatus. More particularly, the invention relates to an information processing apparatus for attaching information regarding an unattended recording reservation to an e-mail destined for a terminal so that the terminal, upon receipt of the e-mail, will automatically execute the unattended recording as reserved.

BACKGROUND ART

Today, there are technologies gaining widespread use and allowing a built-in tuner of a personal computer to receive image and sound signals from TV stations so as to convert the received image and sound signals into digital data that are recorded to a suitable storage medium such as a hard disc and retrieved as needed for reproduction.

Illustratively, TV program recording reservation software called Giga Pocket (registered trademark) is run on VAIO (trademark) personal computers produced and marketed by this applicant. The software allows users to enter such information as a channel number or name, a broadcast start time, and a broadcast stop time about a desired TV program by use of input devices such as a keyboard and a mouse. The information thus entered causes the software to establish a reservation of the TV program in question for unattended recording.

FIGS. 1 through 3 are explanatory views of conventional unattended recording reservation setting screens for use with Giga Pocket.

When the user enters a suitable key command to start a recording reservation program, the personal computer displays a window prompting the user to set a recording channel, a recording start date and a recording start time of the desired TV program, as shown in FIG. 1. Thus prompted, the user inputs the desired channel, start date and start time into the suitable fields of the window.

After entering the channel, start date and start time into the window, the user clicks on a button "NEXT." This causes the personal computer to acquire the input recording channel, recording start date and recording start time from the appropriate fields of the window, and to display another window prompting the user to set a recording stop time and a recording mode, as depicted in FIG. 2.

The user inputs the relevant stop time and recording mode into the window of FIG. 2 and clicks on the button "NEXT." This causes the personal computer to acquire the entered recording stop time and recording mode from the appropriate fields of the window, and to display yet another window calling on the user to confirm the settings made so far, as illustrated in FIG. 3.

If no error is found in the input settings displayed in the window of FIG. 3, the user clicks on a button "COMPLETE" for confirmation. This allows the personal computer to complete the reservation of the desired TV program for subsequent unattended recording.

Recent years have witnessed the introduction of a feature made up of techniques for allowing users at remote locations to set unattended recording reservations by remote control. This feature is convenient when utilized by users who are away from home but still want to get desired TV programs recorded unattended.

Illustratively in Japanese Patent Laid-open No. Hei 10-261251, this applicant proposes a method for remotely setting a video deck for unattended recording using an e-mail.

One disadvantage of the proposed method above is that when setting an unattended recording reservation by remote control, the user at a remote location must refer to TV listings in newspapers or magazines before entering the necessary information for the reservation. Looking up the published TV listings prior to input can be a tiresome, time-consuming chore for the user.

Furthermore, if it is desired to change or cancel previously established recording reservations, the operations involved can be inordinately complex.

DISCLOSURE OF INVENTION

The present invention has been made in view of the above circumstances and provides an apparatus, a method and a program for allowing the user to set unattended recording reservations easily and quickly from a remote location via a network.

According to a first aspect of the invention, there is provided a program information providing apparatus comprising: a storing element for storing control data for controlling reservation of a program for unattended recording; a providing element which, if a first information processing apparatus requests provision of program information about the program over a network, then provides the program information to the first information processing apparatus; a determining element which, based on user information sent from the first information processing apparatus regarding a user of the first information processing apparatus, determines a first and a second e-mail address from previously registered information, the first e-mail address corresponding to the first information processing apparatus as a destination to which a result of setting the unattended recording reservation is to be reported, the second e-mail address corresponding to a second information processing apparatus on which the unattended recording reservation is to be set; a preparing element which, if the first information processing apparatus requests by e-mail that the control data be sent over the network to the second information processing apparatus, then reads the control data, which is designated by said user of said first information processing apparatus, from the storing element before preparing an e-mail by attaching to the e-mail the retrieved control data and the first e-mail address determined by the determining element as representative of the destination to which the result of the setting of the unattended recording reservation is to be reported; and a sending element for sending the e-mail prepared by the preparing element over the network to the second information processing apparatus corresponding to the second e-mail address.

In one preferred structure according to the seventh aspect of the invention, the control data may include channel information, a recording start date, a recording start time, and a recording stop time.

In another preferred structure according to the seventh aspect of the invention, the control data may be added to the e-mail as an attachment.

In a further preferred structure according to the seventh aspect of the invention, the control data may be described in a message of the e-mail.

In an even further preferred structure according to the seventh aspect of the invention, the sending element may attach the control data to a general-purpose e-mail before sending the general-purpose e-mail together with the attached control data to the second information processing apparatus over the network.

In a still further preferred structure according to the seventh aspect of the invention, the general-purpose e-mail may be sent and received over the Internet.

According to a second aspect of the invention, there is provided a program information providing method comprising the steps of: storing control data for controlling reservation of a program for unattended recording; if a first information processing apparatus requests provision of program information about the program over a network, then providing the program information to the first information processing apparatus; based on user information sent from the first information processing apparatus regarding a user of the first information processing apparatus, determining a first and a second e-mail address from previously registered information, the first e-mail address corresponding to the first information processing apparatus as a destination to which a result of setting the unattended recording reservation is to be reported, the second e-mail address corresponding to a second information processing apparatus on which the unattended recording reservation is to be set; if the first information processing apparatus requests by e-mail that the control data be sent over the network to the second information processing apparatus, then reading the control data, designated by said user of said first information processing apparatus and stored in the storing step, before preparing an e-mail by attaching to the e-mail the retrieved control data and the first e-mail address determined in the determining step as representative of the destination to which the result of the setting of the unattended recording reservation is to be reported; and sending the e-mail prepared in the preparing step over the network to the second information processing apparatus corresponding to the second e-mail address.

According to a third aspect of the invention, there is provided a program storage medium which stores a computer-readable program comprising the steps of: storing control data for controlling reservation of a program for unattended recording; if a first information processing apparatus requests provision of program information about the program over a network, then providing the program information to the first information processing apparatus; based on user information sent from the first information processing apparatus regarding a user of the first information processing apparatus, determining a first and a second e-mail address from previously registered information, the first e-mail address corresponding to the first information processing apparatus as a destination to which a result of setting the unattended recording reservation is to be reported, the second e-mail address corresponding to a second information processing apparatus on which the unattended recording reservation is to be set; if the first information processing apparatus requests by e-mail that the control data be sent over the network to the second information processing apparatus, then reading the control data, designated by said user of said first information processing apparatus and stored in the storing step, before preparing an e-mail by attaching to the e-mail the retrieved control data and the first e-mail address determined in the determining step as representative of the destination to which the result of the setting of the unattended recording reservation is to be reported; and sending the e-mail prepared in the preparing step over the network to the second information processing apparatus corresponding to the second e-mail address.

Where the program information providing apparatus, program information providing method, and program storage medium according to the first, the second, and the third aspects of the invention respectively are in use, upon receipt of user information from the first information processing apparatus regarding its user, a first and a second e-mail address are determined from previously registered information. The first e-mail address corresponds to the first information processing apparatus as a destination to which a result of setting the unattended recording reservation is to be reported, and the second e-mail address corresponds to the second information processing apparatus on which the unattended recording reservation is to be set. If the first information processing apparatus requests by e-mail that control data be sent over the network to the second information processing apparatus, then an e-mail is prepared by attaching to it the control data retrieved from storage as designated by the user and the first e-mail address. The e-mail thus prepared is sent over the network to the second information processing apparatus.

According to a fourth aspect of the invention, there is provided an image recording system comprising a program information providing apparatus, a first information processing apparatus and a second information processing apparatus, the program information providing apparatus providing over a network control data for controlling reservation of a program for unattended recording, the first information processing apparatus reserving the program for unattended recording, the second information processing apparatus recording the program in unattended fashion; wherein the program information providing apparatus comprises: a storing element for storing the control data; a determining element which, based on user information sent from said first information processing apparatus regarding a user of said first information processing apparatus, determines a first and a second e-mail address form previously registered information, said first e-mail address corresponding to said first information processing apparatus as a destination to which a result of setting the unattended recording reservation is to be reported, said second e-mail address corresponding to said second information processing apparatus on which said unattended recording reservation is to be set; a preparing element which, if the first information processing apparatus requests that the control data be sent over the network to the second information processing apparatus, then reads the control data, which is designated by said user of said first information processing apparatus, from the storing element before preparing an e-mail by attaching the retrieved control data to the e-mail; and a sending element for sending the e-mail prepared by the preparing element to the second information processing apparatus over the network; wherein the first information processing apparatus comprises: a selecting element for initially controlling display of program information provided by the program information providing apparatus over the network, before selecting the program from among the programs covered by the program information; and a requesting element which, if the program is selected by the selecting element, then requests the program information providing apparatus to send the control data to the second information processing apparatus over the network; and wherein the second information processing apparatus comprises: a receiving element for receiving the e-mail sent from the program information providing apparatus over the network; and a recording controlling element for initially storing the control data attached to the e-mail received by the receiving element, before controlling unattended recording of the program based on the stored control data.

Where the image recording system according to the fourth aspect of the invention is in use, upon receipt of user information from the first information processing apparatus regarding its user, a first and a second e-mail address are determined from previously registered information. The first e-mail address corresponds to the first information processing apparatus as a destination to which a result of setting the unattended recording reservation is to be reported, and the second e-mail address corresponds to the second information processing apparatus on which the unattended recording reservation is to be set. If the first information processing apparatus requests by e-mail that control data be sent over the network to the second information processing apparatus, then an e-mail is prepared by attaching to it the control data retrieved from storage as designated by the user and the first e-mail address. The e-mail thus prepared is sent over the network to the second information processing apparatus. Given the e-mail, the second information processing apparatus controls unattended recording of the designated program.

BRIEF DESCRIPTION OF DRAWINGS

FIG. 1 is a schematic view of a conventional unattended recording reservation setting screen;

FIG. 2 is a schematic view of another conventional unattended recording reservation setting screen;

FIG. 3 is a schematic view of another conventional unattended recording reservation setting screen;

FIG. 17 is a schematic view of a region selection screen;

FIG. 18 is a schematic view of a category selection screen;

FIG. 19 is a schematic view of another category selection screen;

FIG. 20 is a schematic view of another category selection screen;

FIG. 21 is a schematic view of a TV program information screen;

FIG. 22 is a schematic view of an example of unattended recording reservation data;

FIG. 23 is a schematic view of a melody setting screen;

FIG. 29 is a schematic view showing an example of a channel conversion file;

FIG. 30 is a schematic view of another e-mail screen;

FIG. 31 is a schematic view of another e-mail screen;

FIG. 33 is a schematic view of another e-mail screen;

FIG. 34 is a schematic view of another e-mail screen;

FIG. 36 is a flowchart of steps constituting a recording process;

FIG. 37 is a flowchart of steps constituting a TV program reservation process carried out by an image recording system;

FIG. 39 is a schematic view of a TV program reservation screen;

FIG. 40 is a schematic view of a TV listing screen;

BEST MODE FOR CARRYING OUT THE INVENTION

Figure 4:
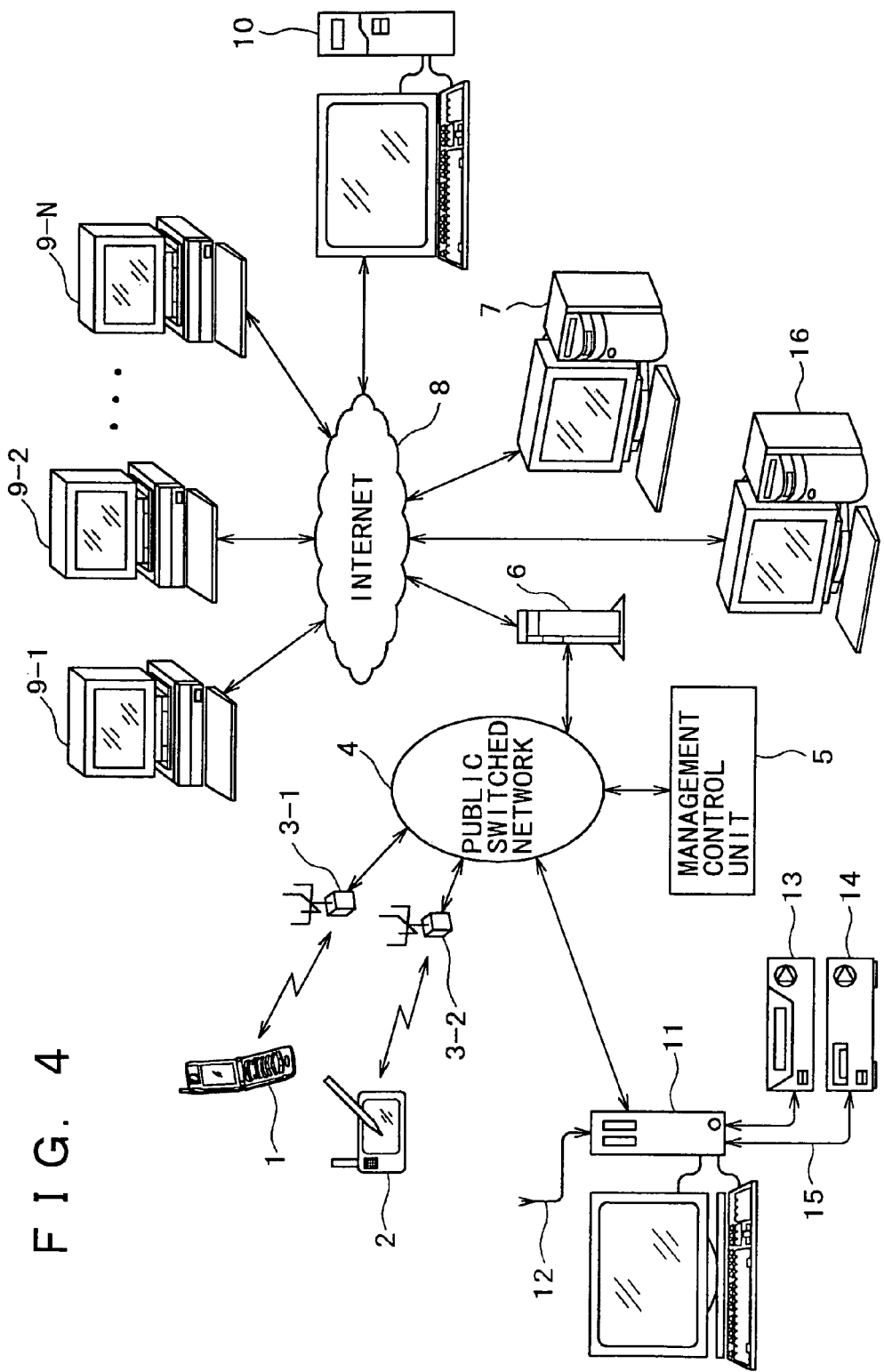
FIG. 4 is a schematic view outlining a typical configuration of an image recording/reproduction system practiced as an embodiment of this invention.

FIG. 4 schematically outlines a typical configuration of an image recording/reproduction system practiced as a first preferred embodiment of this invention.

A camera-equipped digital mobile telephone 1 and a PDA 2 are connected to a public switched network 4 via base stations 3-1 and 3-2 that function as fixed wireless terminals. Each base station 2 is set up in one of suitably apportioned geographical areas called cells covered by a communication service. A personal computer 11 is also connected to the public switched network 4.

The base stations 3-1 and 3-2 are wirelessly connected to the camera-equipped digital mobile telephone 1 and PDA 2 (i.e., mobile wireless terminals) illustratively on a W-CDMA (Wideband-Code Division Multiple Access) basis. The wireless connection allows large quantities of data to be communicated between the two terminals at transfer speeds of up to 2 Mbps using a 2 GHz frequency band.

The base stations 3-1 and 3-2 are wired to the public switched network 4. In turn, the public switched network 4 is connected to the Internet 8 as well as to wired subscriber terminal equipment, computer networks and intranets, not shown.

As mentioned, the camera-equipped digital mobile telephone 1 and PDA 2 can communicate large quantities of data with the base stations 3-1 and 3-2 at high speed on a W-CDMA basis. The mobile wireless terminals are thus capable of carrying out diverse kinds of data communication including sending and receiving of e-mails, browsing of simple-format websites, and exchanges of images.

The camera-equipped digital mobile telephone 1 and PDA 2 are connected to an EPG (electronic program guide) server 10 via the Internet 8. In this setup, the wireless terminals may request the EPG server 10 to send recording reservation data by which to reserve unattended recording of a desired TV program from a particular TV station. As with the camera-equipped digital mobile telephone 1 and PDA 2, another personal computer 16 is connected to the EPG server 10 via the Internet 8. The personal computer 16 may likewise request the EPG server 10 to send recording reservation data by which to reserve unattended recording of a specific TV program from a certain TV station.

An access server 6 of an Internet service provider is connected not only to the public switched network 4 but also to a content server 7 of the ISP either directly or via the Internet 8.

In response to requests from the personal computers 11 and 16, the content server 7 provides the requesting PCs with content such as website data in HTML (Hyper Text Markup Language) files. Also in response to requests from the wired subscriber terminal equipment, camera-equipped digital mobile telephone 1 and PDA 2, the content server 7 provides the requesting apparatuses with such content as simple-format website data in compact HTML files.

The Internet 8 is also connected to numerous WWW (World Wide Web) servers 9-1 through 9-N and personal computers 16 set up within corporations. The WWW servers 9-1 through 9-N are accessed in accordance with TCP/IP (Transmission Control Protocol/Internet Protocol) by the wired subscriber terminal equipment, camera-equipped mobile telephone 1, PDA 2, and personal computers 11 and 16.

The camera-equipped digital mobile telephone 1 and PDA 2 communicate with the base stations 3-1 and 3-2 in keeping with a simple-format transport protocol at 2 Mbps. Communications take place as per TCP/IP between the base stations 3-1 and 3-2 on the one hand and the Internet 8 as well as the WWW servers 9-1 through 9-N on the other hand.

A management control unit 5 is connected to the wired subscriber terminal equipment, camera-equipped digital mobile telephone 1 and PDA 2 via the public switched network 4. In this setup, the management control unit 5 carries out authentication and billing processes with regard to the connected apparatuses.

The personal computer 11 inputs signals from an antenna 12 that receives radio waves from TV stations, reproduces images and sounds of a given TV program from the input signals, and records the reproduced images and sounds. The personal computer 11 is also supplied with analog signals from a VCR (video cassette recorder) 13 or with digital data sent from a DVCR (digital video cassette recorder) 14 over a network 15 such as an IEEE (Institute of Electrical and Electronic Engineers) 1394 network. The PC 11 reproduces images and sounds from the supplied signals or data, and records the reproduced images and sounds.

In addition, the personal computer 11 feeds the VCR 13 with analog signals or the DVCR 14 with digital data, the signals and the data representing recorded images and sounds retrieved from storage. Furthermore, the personal computer 11 receives an e-mail over the Internet 8, and based on the recording reservation data that may be attached to the e-mail, reserves a desired TV program for subsequent unattended recording.

The EPG (electronic program guide) server 10 is a Web server that has an EPG information database comprising EPG information (i.e., TV listings) and recording reservation data for allowing desired TV programs from specific TV stations to be reserved for unattended recording. The EPG server 10 also receives messages from the camera-equipped digital mobile telephone 1, PDA 2, and personal computer 16 requesting transmission of the recording reservation data. Given a message requesting a particular TV program name, the EPG server 10 searches the EPG information database for the recording reservation data applicable to the requested TV program, attaches the retrieved reservation data to an e-mail, and sends the e-mail thus prepared to the personal computer 11 through the Internet 8, access server 6, and public switched network 4.

Figure 5:
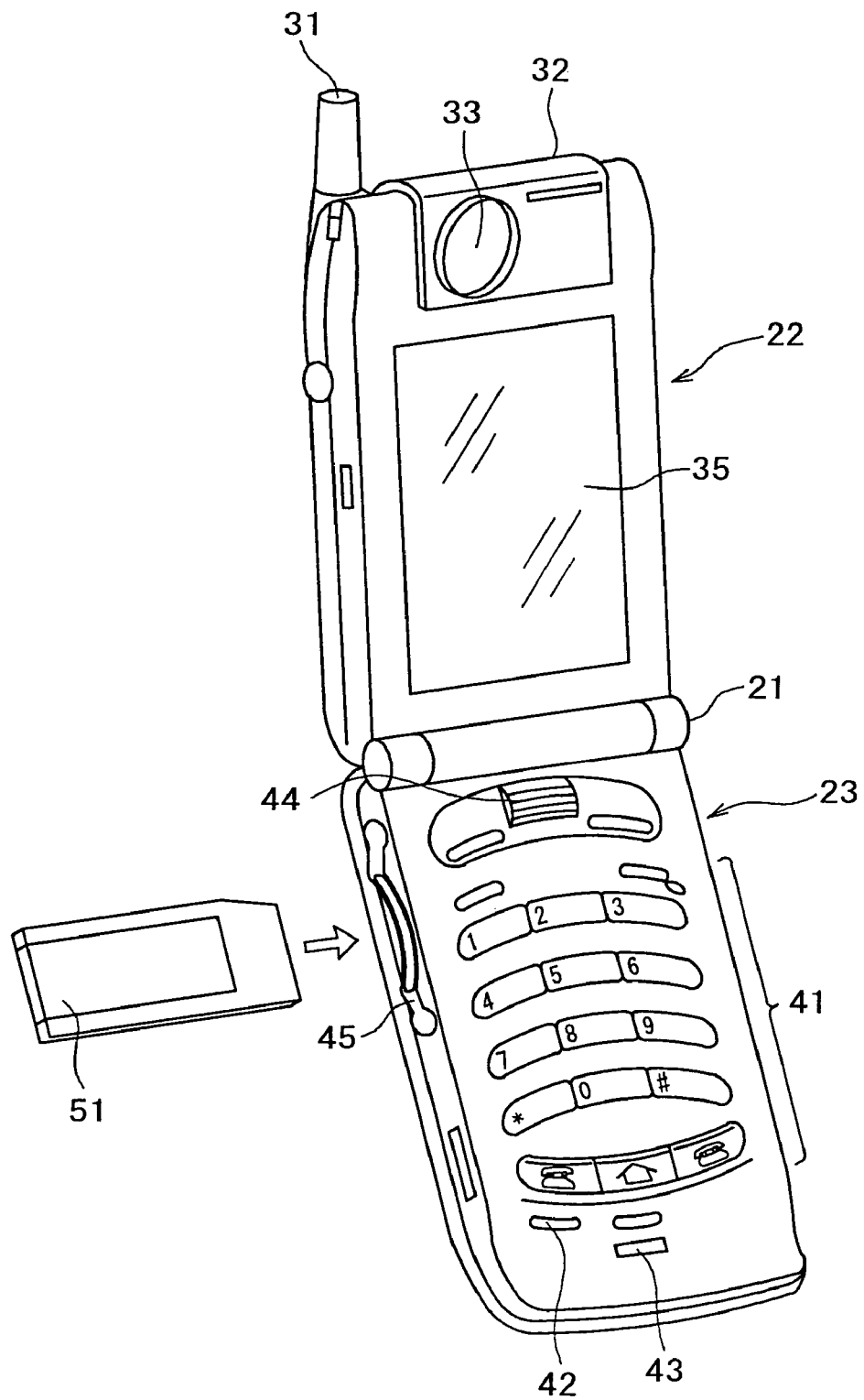
FIG. 5 is an external view showing an overall external structure of a camera-equipped digital mobile telephone in the system.
Figure 6:
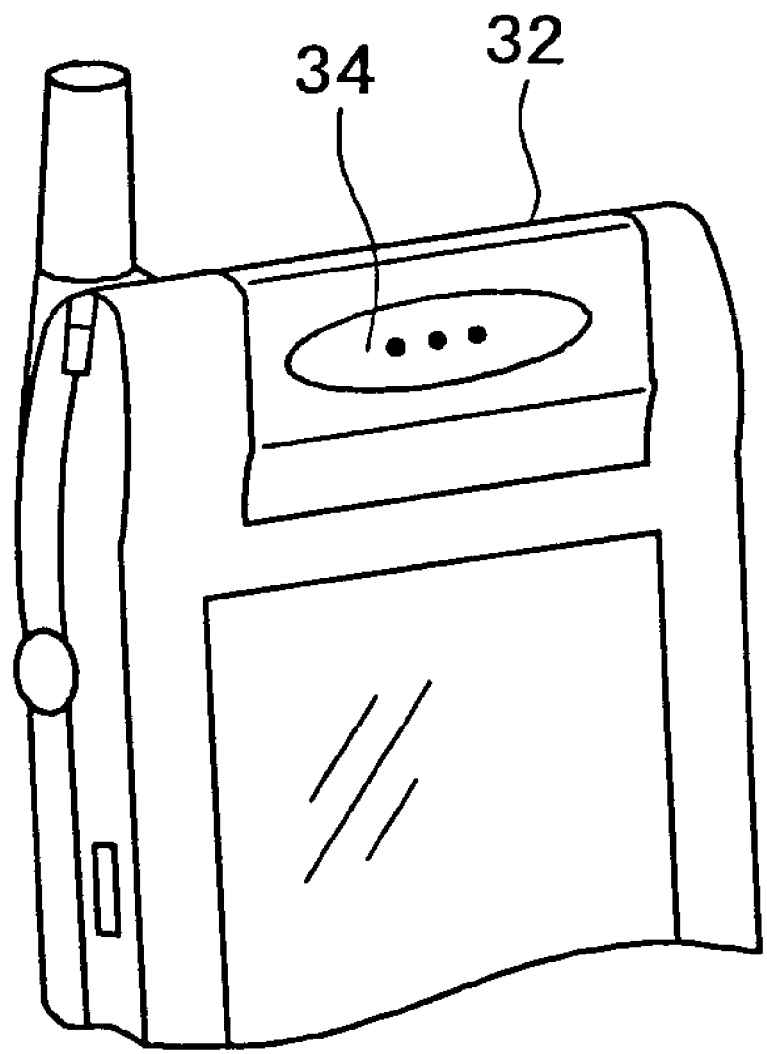
FIG. 6 is an external view of a display unit as part of the camera-equipped digital mobile telephone.

FIG. 5 is an external view showing an overall external structure of the camera-equipped digital mobile telephone 1. As shown in FIG. 5, the mobile telephone 1 is made up of a display unit 22 and a body 23. The two components are coupled by a centrally located hinge 21 in a foldable manner.

The display unit 22 has a retractable antenna 31 on its top left portion. The camera-equipped digital mobile telephone 1 sends and receives radio waves to and from the base station 3-1 (i.e., fixed wireless station) via the antenna 31.

The display unit 22 also has a camera unit 32 furnished at its top center in a manner rotatable over a range of about 180 degrees. A CCD camera 33 in the camera unit 32 allows the user of the mobile telephone 1 to take pictures of desired objects.

If the user positions the camera unit 32 by rotating it about 180 degrees, the display unit 22 is positioned so that a speaker 34 at the center back of the camera unit 32 comes in front. In this state, the camera-equipped digital mobile telephone 1 is switched to regular voice communication mode.

A liquid crystal display 35 is furnished on the front of the display unit 22. The LCD 35 displays a radio wave reception state, a battery level, telephone directory entries including names, telephone numbers and call records; e-mail text, simple-format website content, and images taken by the CCD camera 33 of the camera unit 32.

The body 23 comprises on its surface various operation keys 41 including numeric keys 0 through 9, an off-hook key, a redial key, an on-hook/power key, a clear key, and an e-mail key. Operating any of the operation keys 41 enters the corresponding instruction into the camera-equipped digital mobile telephone 1.

Under the operation keys 41 of the body 23 are a memo button 42 and a microphone 43. Operating the memo button 42 causes the mobile telephone 1 to record the other party's voice during the call. The microphone 43 of the telephone 1 picks up the user's voice while the call is being effected.

A rotatable jog dial 44 is furnished above the operation keys 41 on the body 23, in such a manner that the dial 44 slightly projects from the surface of the body 23. As the jog dial 44 is rotated, the camera-equipped digital mobile telephone 1 accordingly performs diverse operations on the LCD 35: scrolling up and down a telephone directory list or an e-mail text, feeding pages of a simple-format website, or shifting an image from one display position to another.

For example, in response to the user's rotating operation of the jog dial 44, the body 23 may highlight a desired telephone number from among a plurality of telephone numbers in the telephone directory list displayed on the LCD 35, and select the highlighted number definitively when the user pushes the jog dial 44 into the body 23. A call is automatically placed to the telephone number thus selected.

The body 23 has a battery pack incorporated in its rear portion, not shown. Turning on the on-hook/power key causes the battery pack to power the internal circuits and brings the telephone into an operable state.

In the top left-side portion of the body 23 is a memory stick slot 45 that can accommodate a Memory Stick (trademark) 51 in removable fashion. Pressing the memo button 42 causes the camera-equipped digital mobile telephone 1 to start recording the other party's voice into the Memory Stick 51 loaded in the slot 45. In response to the user's operation, the mobile telephone 1 may store e-mail text, simple-format website content, and/or an image taken by the CCD camera 33 into the loaded Memory Stick 51.

The Memory Stick 51 is a flash memory card developed by Sony Corporation, i.e., this applicant. The Memory Stick 51 is housed in a small, thin plastic enclosure which measures 21.5 mm high by 50 mm wide by 2.8 mm thick and which contains flash memory elements constituting an EEPROM (electrically erasable and programmable read-only memory), a nonvolatile memory to and from which data may be electrically written and erased. A 10-pin terminal permits writing and reading of data such as images, voices and music to and from the Memory Stick 51.

The Memory Stick 51 adopts a proprietary serial protocol that ensures compatibility between devices comprising the memory each, even where the specifications for a built-in flash memory are altered in order to address an increased storage capacity. The protocol permits high-speed performance with write speeds of up to 1.5 MB/S and read speeds of up to 2.45 MB/S. A write-protect switch designed to prevent accidental data erasure affords high reliability to the Memory Stick 51.

The camera-equipped digital mobile telephone 1 structured so as to accommodate the Memory Stick 51 may thus share data with other electronic devices that utilize the Memory Stick 51 in common.

Figure 7:
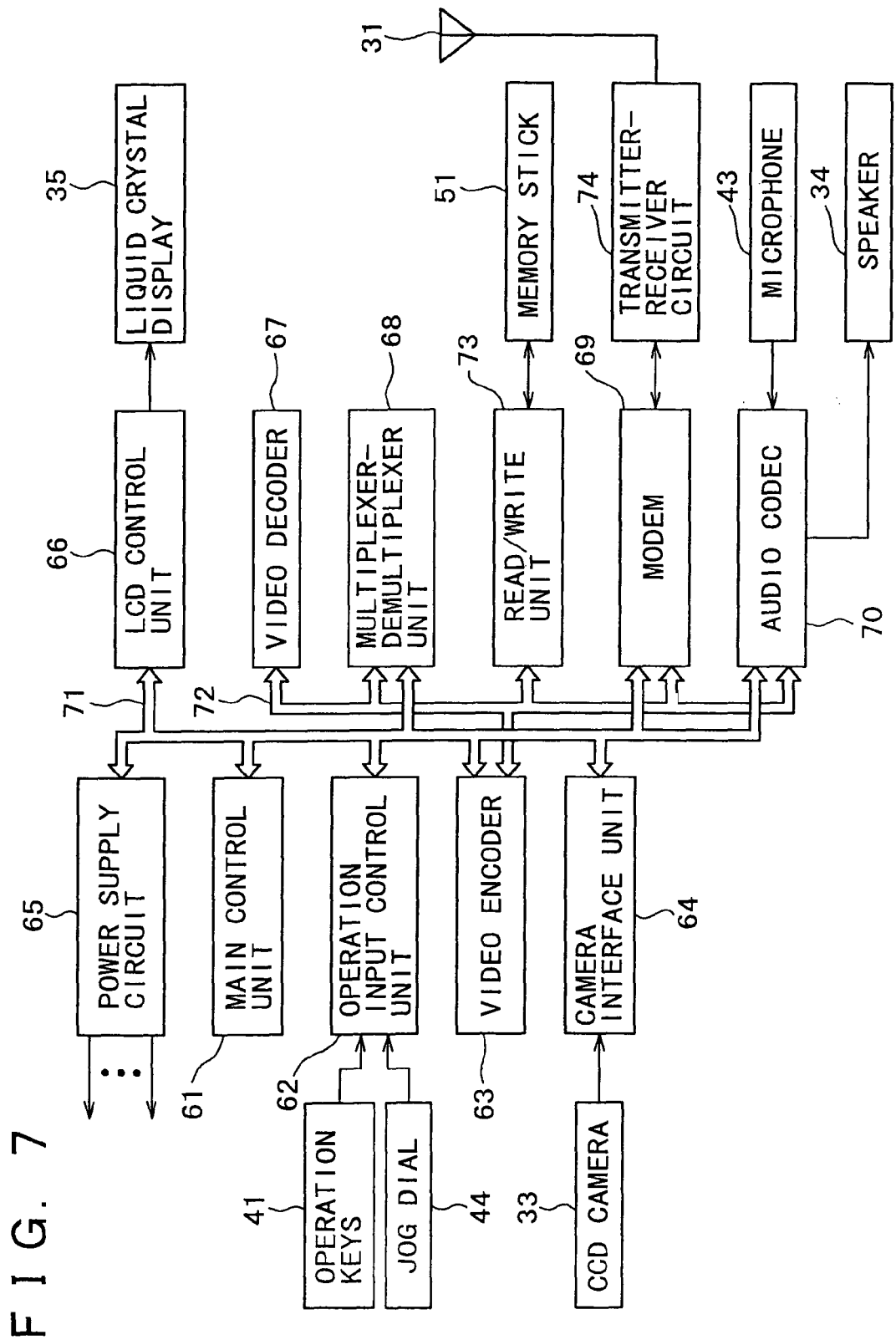
FIG. 7 is a block diagram indicating an internal structure of the camera-equipped digital mobile telephone.

FIG. 7 is a block diagram depicting an internal structure of the camera-equipped digital mobile telephone 1. As shown in FIG. 7, the mobile telephone 1 includes a main control unit 61 that provides overall control on the display unit 22 and body 23. Inside the mobile telephone 1 are the main control unit 61, a power supply circuit 65, an operation input control unit 62, a video encoder 63, a camera interface (I/F) unit 64, an LCD (liquid crystal display) control unit 66, a multiplexer-demultiplexer unit 68, a modem 69, and an audio codec 70, all interconnected via a main bus 71. Furthermore, the video encoder 63, a video decoder 67, the multiplexer-demultiplexer unit 68, a read/write unit 73, the modem 69, and the audio codec 70 are interconnected via a synchronous bus 72.

When the user turns on the on-hook/power key, the power supply circuit 65 causes the battery pack to power the circuits involved. This brings the camera-equipped digital mobile telephone 1 into an operable state.

The main control unit 61 of the camera-equipped digital mobile telephone 1 comprises a CPU (central processing unit), a ROM (read only memory) and a RAM (random access memory). Under control of the main control unit 61, the mobile telephone 1 picks up a sound signal through the microphone 43 in voice communication mode and converts the acquired signal into digital sound data through the audio codec 70. The mobile telephone 1 subjects the resulting digital sound data to a spread-spectrum encoding process of the modem 69. The processed data are arranged to undergo a digital-to-analog conversion process and a frequency conversion process of a transmitter-receiver circuit 74 before being transmitted from the antenna 31.

In voice communication mode, the camera-equipped digital mobile telephone 1 receives a signal through the antenna 31, amplifies the received signal, and subjects the amplified signal to frequency conversion and analog-to-digital conversion. The converted signal is made to undergo a spread-spectrum decoding process of the modem 69 before being converted to an analog sound signal by the audio codec 70. The mobile telephone 1 then causes the speaker 34 to output a sound corresponding to the analog sound signal.

In data communication mode, the camera-equipped digital mobile telephone 1 sends e-mail as follows: the input of e-mail text data is accepted following the user's manipulation of the operation keys 41 and jog dial 44. The input text data are forwarded to the main control unit 61 through the operation input control unit 62.

The main control unit 61 subjects the text data first to spread-spectrum coding of the modem 69 and then to digital-to-analog conversion and frequency conversion of the transmitter-receiver circuit 74. The converted data are sent to the base station 3-1 via the antenna 31.

Also in data communication mode, the camera-equipped digital mobile telephone 1 receives e-mail as follows: a signal carrying the e-mail is received from the base station 3-1 via the antenna 31. The received signal is subjected to spread-spectrum decoding of the modem 69 to restore the original text data. The text data are sent through the LCD control unit 66 to the LCD 35 for display thereon.

In response to the user's operation, the camera-equipped digital mobile telephone 1 may store received e-mails into the Memory Stick 51 through the read/write unit 73.

In data communication mode, the camera-equipped digital mobile telephone 1 may send image data acquired by the CCD camera 33. In that case, the image data are fed to the video encoder 63 through the camera interface unit 64.

When not sending the image data obtained by the CCD camera 33, the camera-equipped digital mobile telephone 1 may forward the data through the camera interface unit 64 and LCD control unit 66 to the LCD 35 for direct display thereon.

The video encoder 63 converts the image data from the CCD camera 33 illustratively into compression-coded image data using a suitable coding method such as MPEG-2 (Moving Picture Experts Group Phase 2) or MPEG-4. The image data thus coded are fed to the multiplexer-demultiplexer unit 68.

At the same time, any voice picked up by the microphone 43 during image pickup by the CCD camera 33 is converted to digital sound data by the audio codec 70 of the mobile telephone 1. The digital sound data are forwarded to the multiplexer-demultiplexer unit 68.

The multiplexer-demultiplexer unit 68 multiplexes coded image data from the video encoder 63 with sound data from the audio codec 70 using a predetermined method. The multiplexed data are subjected first to spread-spectrum coding of the modem 69 and then to digital-to-analog conversion and frequency conversion of the transmitter-receiver circuit 74. The converted data are transmitted via the antenna 31.

In data communication mode, the camera-equipped digital mobile telephone 1 may receive dynamic image file data linked illustratively to a simple-format website as follows: a signal carrying the data is received from the base station 3-1 via the antenna 31. The received signal is subjected to spread-spectrum decoding of the modem 69. Multiplexed data resulting from the decoding process by the modem 69 are sent to the multiplexer-demultiplexer unit 68.

The multiplexer-demultiplexer unit 68 demultiplexes the multiplexed data into coded image data and sound data. Over the synchronous bus 72, the coded image data are sent to the video decoder 67 and the sound data to the audio codec 70.

The video decoder 67 reproduces dynamic image data by decoding the coded image data using a predetermined decoding method such as MPEG-2 or MPEG-4. The reproduced dynamic image data are supplied to the LCD 35 through the LCD control unit 66. The steps above allow the camera-equipped digital mobile telephone 1 to display dynamic image data acquired illustratively from a dynamic image file linked to a simple-format website.

At the same time, the audio codec 70 converts the sound data to an analog sound signal before sending the signal to the speaker 34. This enables the camera-equipped digital mobile telephone 1 to reproduce the sound data acquired from the dynamic image file linked to the simple-format website.

As in the case of e-mails, given the user's suitable operation, the camera-equipped digital mobile telephone 1 may have the read/write unit 73 write into the Memory Stick 51 the received data from linked simple-format websites.

Figure 8:
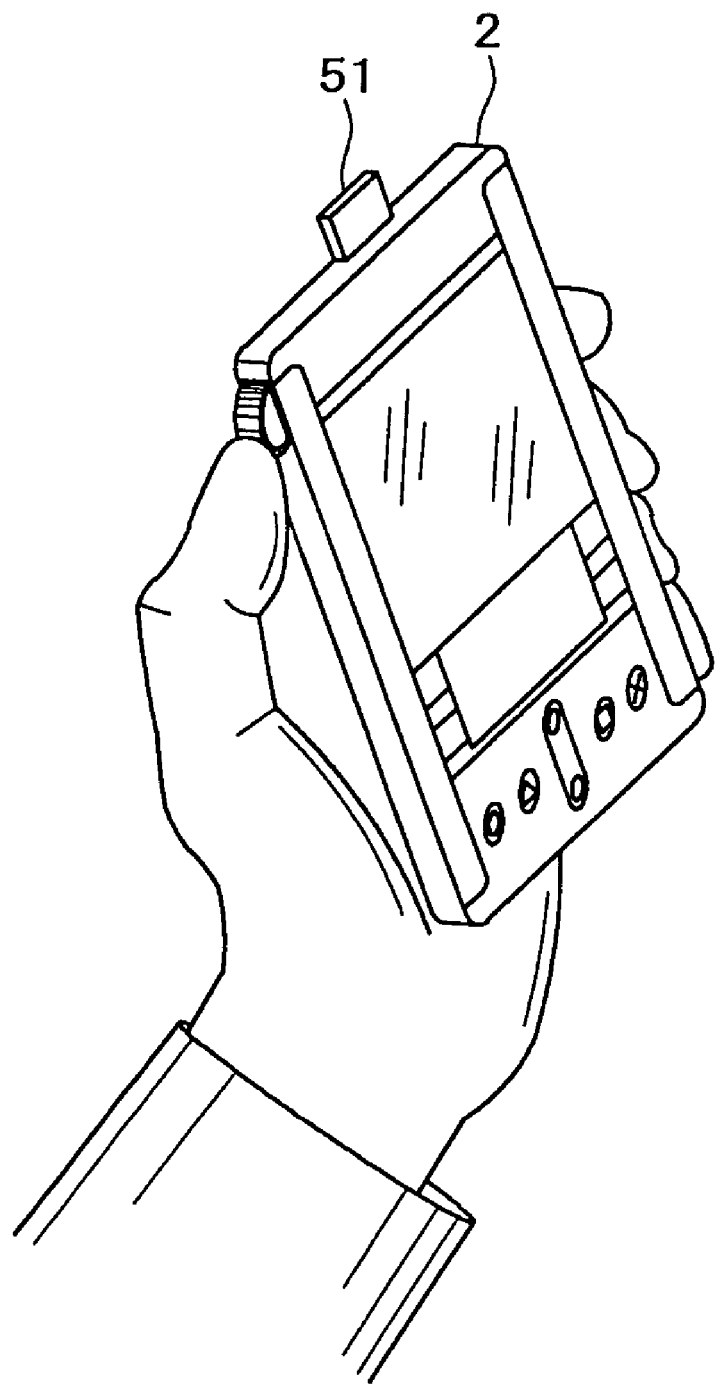
FIG. 8 is a perspective view of a PDA in the system.
Figure 9:
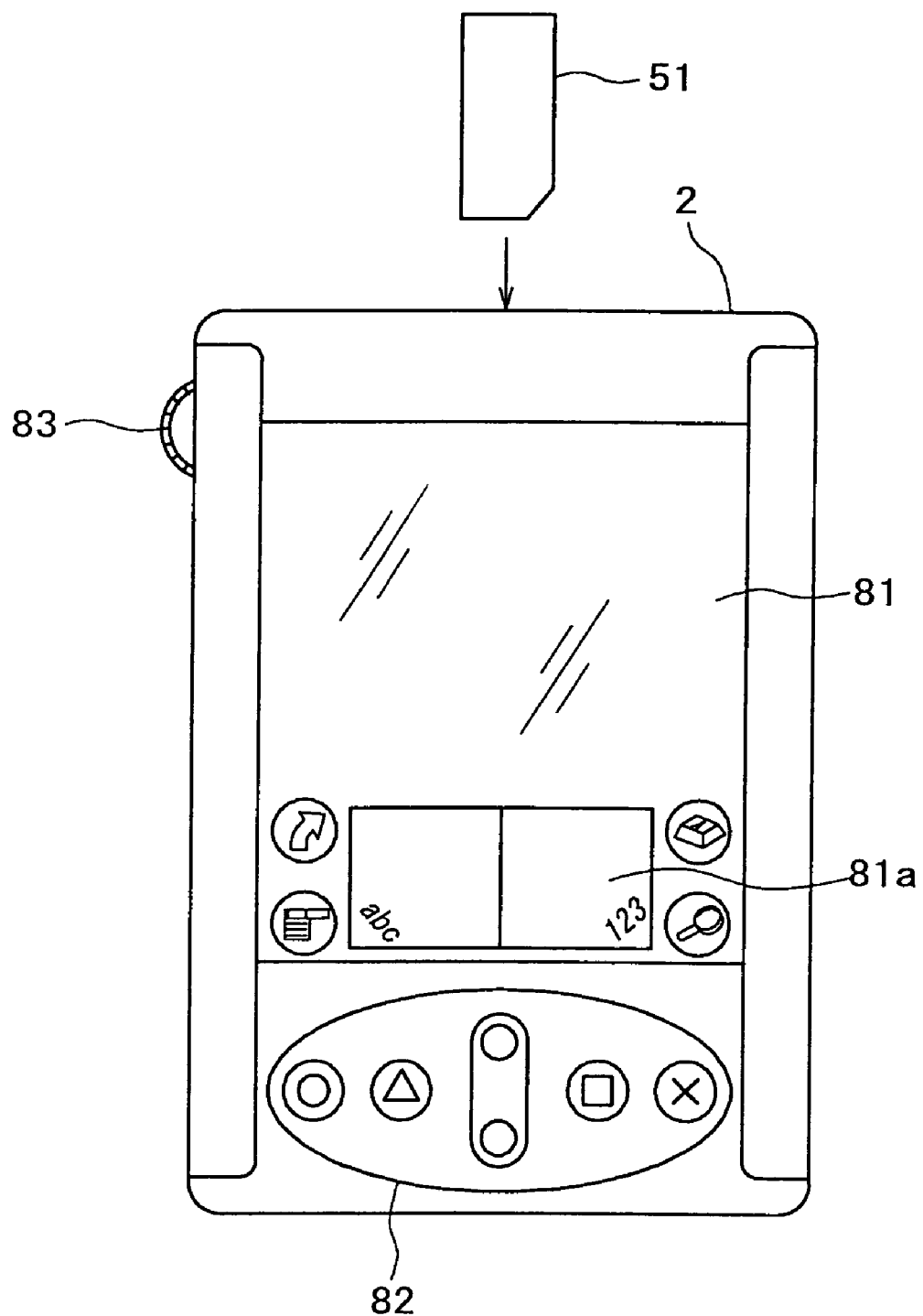
FIG. 9 is a front view of the PDA.

An external structure of the PDA 2 is illustrated in FIGS. 8 and 9. FIG. 8 is a perspective view of the PDA 2 as it is held in the user's hand, and FIG. 9 is a front view of the PDA 2.

The PDA 2 has its body formed so as to be held in and operated by one hand. At the top of the PDA 2 is a slot for accommodating the Memory Stick 51 incorporating a semiconductor memory.

At the bottom of the PDA 2 is a USB (universal serial bus) port or the like, not shown, for accommodating a modem or similar device connectable to the public switched network 4. The PDA 2 also has a display unit 81, keys 82, and a jog dial 83.

The display unit 81 is made up of a thinly formed display device such as a liquid crystal display that displays icons, thumbnail images, and text. Under the display unit 81 is a touch pad 81a that may be pushed by fingertips or by the tip of a stylus to enter data or operating instructions into the PDA 2.

Figure 10:
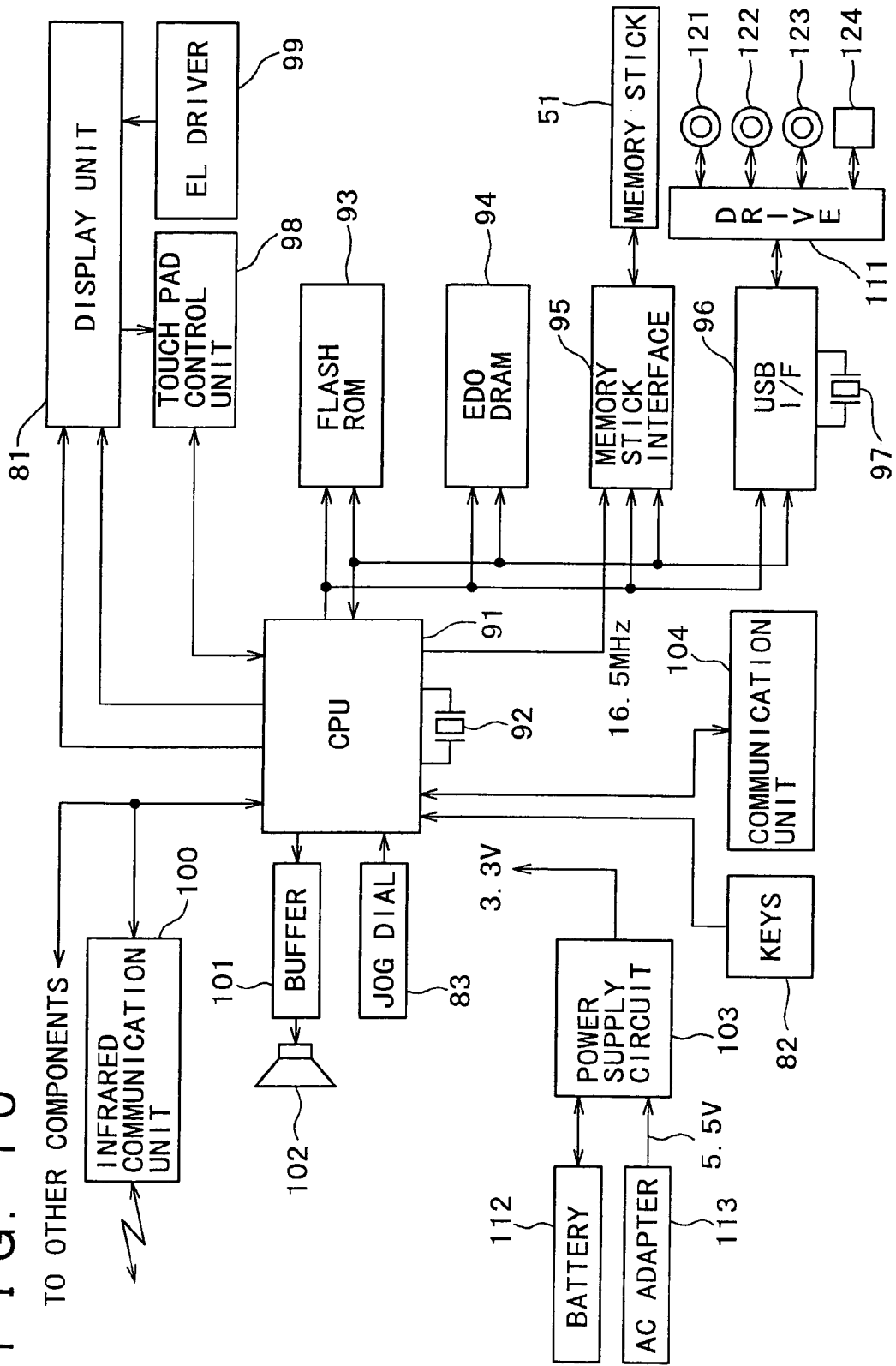
FIG. 10 is a block diagram depicting an electrical structure of the PDA.

The keys 82 are operated by the user for input of various commands into a CPU 91 (see FIG. 10).

The jog dial 83 is rotated or pressed into the body to select an icon or a thumbnail on the display unit 81.

FIG. 10 is a block diagram depicting an electrical structure of the PDA 2. In the setup of FIG. 10, a CPU (central processing unit) 91 runs an operating system and executes various application programs in a flash ROM (read-only memory) 93 or an EDO-DRAM (extended data-out dynamic random-access memory) 94 in synchronism with a clock signal from an oscillator 92.

The flash ROM 93 is made up of a flash memory, a variation of EEPROM (electrically erasable programmable read-only memory). Generally, the flash ROM 93 accommodates basically fixed data as part of the programs and operation parameters used by the CPU 91. The EDO-DRAM 94 stores programs executed by the CPU 91, data needed for the program execution, and parameters varied as needed during the execution.

A Memory Stick interface (I/F) 95 reads data from the Memory Stick 51 loaded into the PDA 2 and writes data coming from the CPU 91 to the Memory Stick 51.

Acting in synchronism with a clock signal from an oscillator 97, a USB (universal serial bus) interface (I/F) 96 connected to a drive 111 (i.e., a USB device) admits data and programs from the connected drive 111 and supplies data coming from the CPU 91 to the drive 111.

The drive 111 is loaded as needed with a magnetic disc 121, an optical disc 122, a magneto-optical disc 123, or a semiconductor memory 124. The drive 111 reads data or programs from the loaded storage medium and sends the retrieved data or programs to the CPU 91 or EDO-DRAM 94 through the USB interface 96. In addition, the drive 111 writes data or programs to the magnetic disc 121, optical disc 122, magneto-optical disc 123, or semiconductor memory 124 loaded therein.

The flash ROM 93, EDO-DRAM 94, Memory Stick interface 95, and USB interface 96 are connected to the CPU 91 through an address bus and a data bus.

The display unit 81 receives data from the CPU 91 via an LCD bus and displays images or characters representative of the received data. When the touch pad 81a under the display unit 81 is operated on, a touch pad control unit 98 receives data corresponding to the operation (e.g., coordinates of the touched location on display) and feeds a signal representing the received data to the CPU 91 over a serial bus.

An EL (electroluminescence) driver 99 activates electroluminescent devices at the back of the liquid crystal display of the display unit 81, controlling the brightness of display on the display unit 81.

An infrared communication unit 100 receives data from the CPU 91 in the form of an infrared signal through a UART (universal asynchronous receiver-transmitter), sends the received data to an external apparatus, not shown, and receives an infrared signal from the external apparatus before supplying the signal to the CPU 91. The PDA 2 can also communicate with other apparatuses via the UART.

A sound reproduction unit 102 is made up of a speaker, a sound data decoding circuit, and other related parts. As such, the sound reproduction unit 102 decodes previously stored sound data or the sound data received from an external apparatus, and reproduces the data for audio output. Illustratively, the sound reproduction unit 102 receives sound data from the CPU 91 via a buffer 101 and reproduces the received data for audio output.

A power supply circuit 103 is fed with a supply voltage either from an attached battery or from a connected AC (alternating current) adapter 113, and converts the voltage to necessary levels to power the components ranging from the CPU 91 to the sound reproduction unit 102.

A communication unit 104 is connected illustratively to the Internet 8. Given data (e.g., e-mail) from the CPU 91, the communication unit 104 puts the data into packets according to a predetermined method, and sends the packetized data to an external apparatus over the Internet 8. The communication unit 104 also supplies the CPU 91 with the data or programs that have been received in packets from the external apparatus over the Internet 8.

Figure 11:
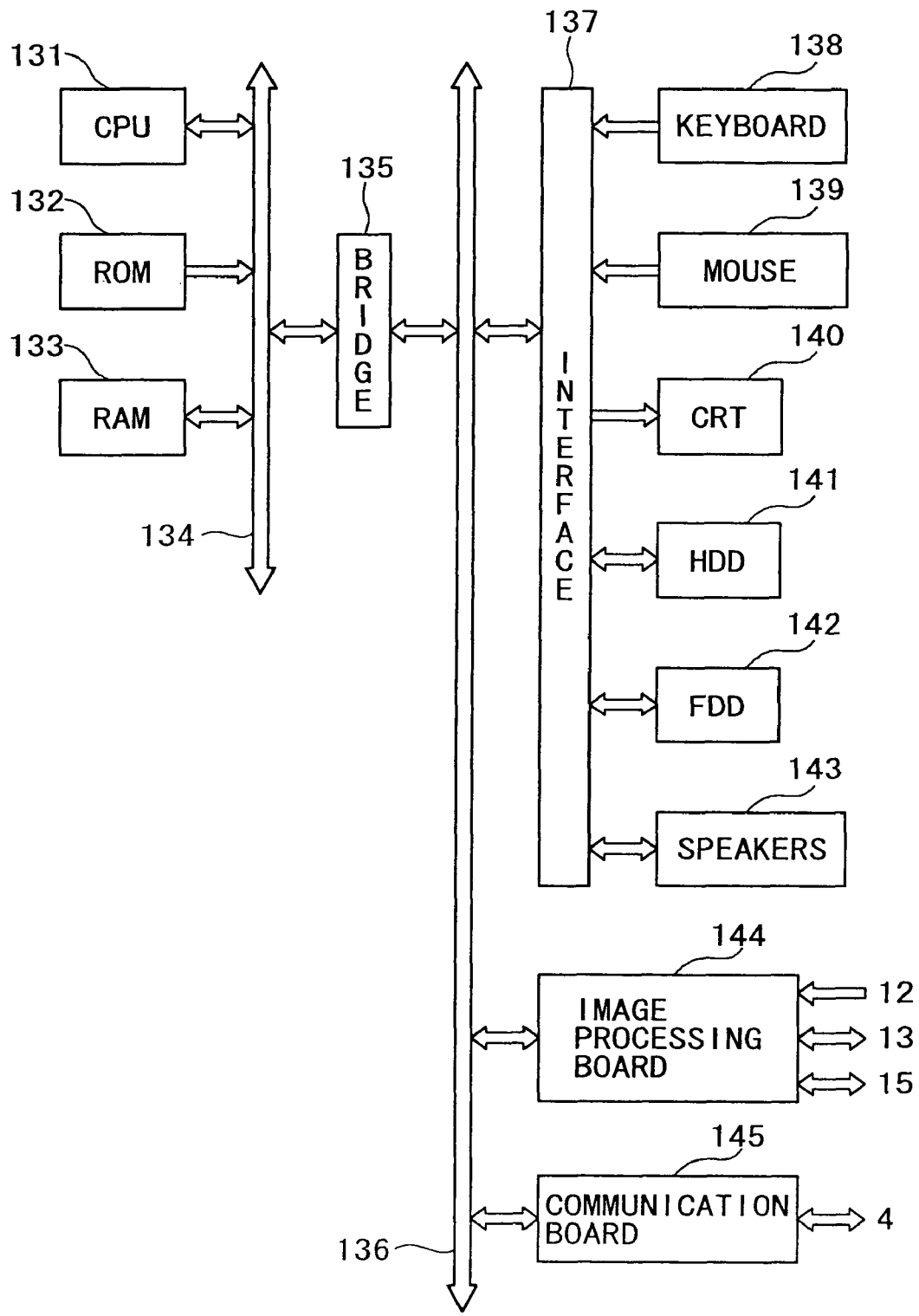
FIG. 11 is a block diagram illustrating a typical structure of a personal computer in the system.

FIG. 11 is a block diagram illustrating a typical structure of the personal computer 11. A CPU 131 executes an operating system (OS) and application programs on the personal computer 11. A ROM 132 accommodates basically fixed data as part of the programs and operation parameters used by the CPU 131. A RAM 133 stores programs executed by the CPU 131 and parameters that are varied as needed during the execution. These component parts are interconnected by a host bus 134.

The host bus 134 is connected via a bridge 135 to an external bus 136 such as a PCI (Peripheral Component Interconnect/Interface) bus.

A keyboard 138 is operated by the user to enter various commands into the CPU 131. A mouse 139 is manipulated by the user to point to and select items on a CRT (cathode ray tube) 140 that displays diverse kinds of information in text and image. A hard disc drive (HDD) 141 and a floppy disc drive (FDD) 142 drive a hard disc and a floppy disc respectively so that programs and information to be handled by the CPU 131 may be written to or read from the disc in question. Speakers 143 are provided to reproduce sounds. The components ranging from the keyboard 138 to the speakers 143 are connected to an interface 137. In turn, the interface 137 is connected to the CPU 131 via the external bus 136, bridge 135, and host bus 134.

An image processing board 144 under control of the CPU 131 generates image and sound data based on signals coming from an antenna 12, on image and sound analog signals from the VCR 13, or on image and sound digital data from the DVCR 14. The image and sound data thus generated are output to the HDD 141 over the external bus 136 and through the interface 137.

Furthermore, the image processing board 144 inputs image and sound data from the HDD 141 over the external bus 136 and through the interface 137, generates analog signals corresponding to the input image and sound data, and supplies the analog signals thus generated to the VCR 13. Alternatively, the image processing board 144 generates digital data corresponding to the input image and sound data and supplies the generated digital data to the DVCR 14 over the network 15.

The image processing board 144 is connected to the CPU 131 via the external bus 136, bridge 135, and host bus 134.

A communication board 145 is a device designed to establish connection with the public switched network 4. Illustratively, the communication board 145 may be constituted by an Ethernet (registered trademark) board connected to the CPU 131 via the external bus 136, bridge 135, and host bus 134.

Figure 12:
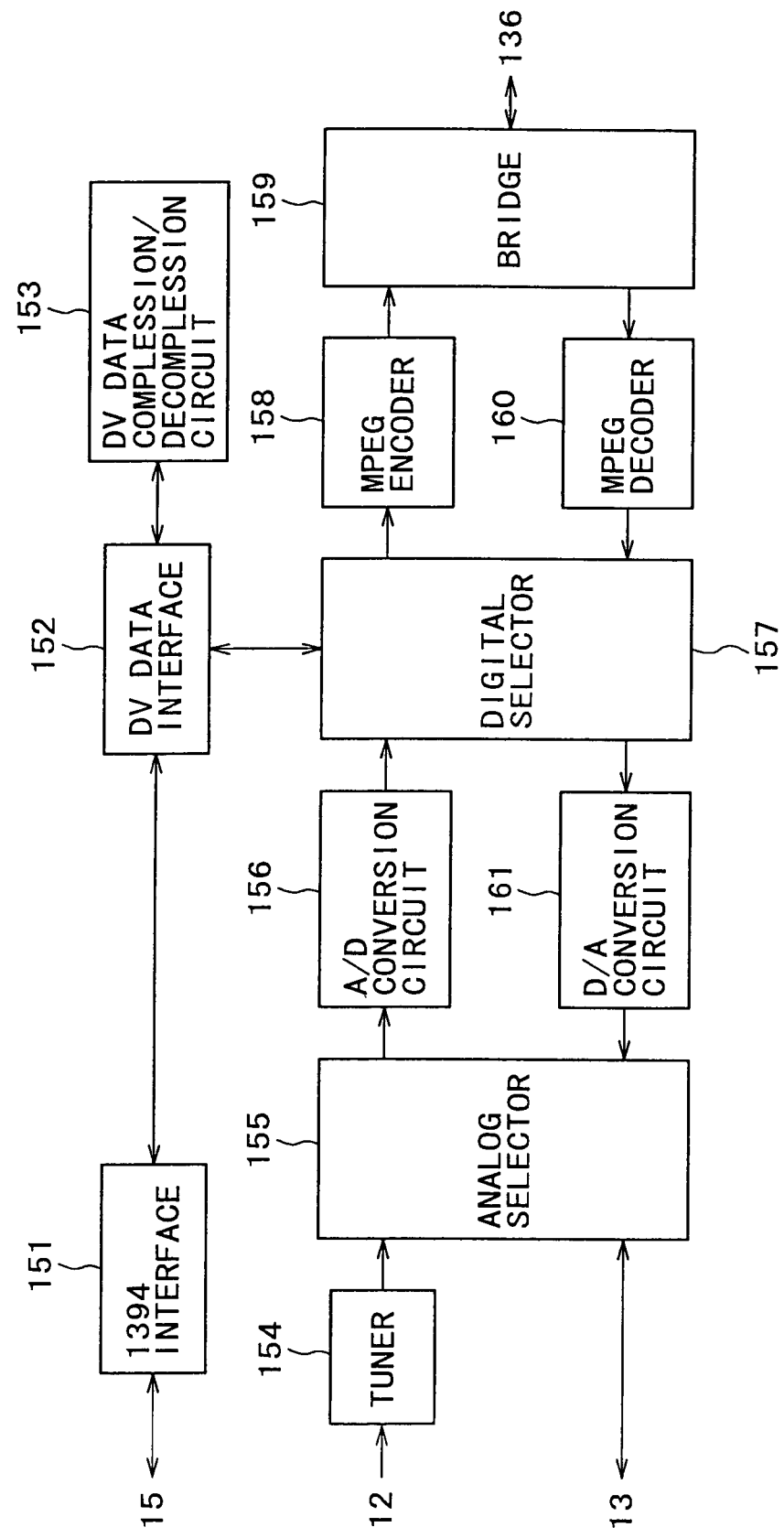
FIG. 12 is a block diagram showing a typical structure of an image processing board in the personal computer.

Described below with reference to FIG. 12 is a detailed structure of the image processing board 144. In FIG. 12, a 1394 interface 151 complies with the IEEE 1394 standards, and based on an IEEE 1394-compatible protocol, receives image and sound digital data in DVCR format from the DVCR 14 and forwards the received data to a DV (digital video) data interface 152.

The 1394 interface 151 also receives image and sound digital data in DVCR format from the DV data interface 152 and supplies the received data to the DVCR 14 in accordance with the IEEE 1394-compatible protocol.

The DV data interface 152 receives either image and sound digital data in DVCR format from the 1394 interface 151 or image and sound digital data from a digital selector 157 (the data are uncompressed digital data such as 4:1:1 data). The data thus received are forwarded to a DV data compression/decompression circuit 153. On receiving the image and sound digital data in DVCR format from the DV data compression/decompression circuit 153, the DV data interface 152 forwards the received data to the 1394 interface 151. Given the image and sound digital data (uncompressed data) from the DV data compression/decompression circuit 153, the DV data interface 152 outputs the data to the digital selector 157.

When receiving image and sound digital data in DVCR format from the DV data interface 152, the DV data compression/decompression circuit 153 decompresses the received data and outputs the decompressed image and sound digital data to the DV data interface 152. Upon receipt of uncompressed image and sound digital data from the DV data interface 152, the DV data compression/decompression circuit 153 compresses the received data and outputs the compressed image and sound digital data in DVCR format to the DV data interface 152.

A tuner 154 inputs RF (radio frequency) signals from the antenna 12 and outputs to an analog selector 155 image and sound analog signals which, based on the RF signals, represent TV programs on specific TV channels. The analog selector 155 selects the image and sound analog signals from the tuner 154, from the VCR 13, or from a D/A (digital/analog) conversion circuit 161. The selected analog signals are output by the analog selector 155 to an A/D (analog/digital) conversion circuit 156 or to the VCR 13.

The A/D conversion circuit 156 converts the image and sound analog signals from the analog selector 155 into digital data and outputs the converted data to the digital selector 157. On receiving image and sound digital data from the DV data interface 152, from the A/D conversion circuit 156, and from an MPEG decoder 160, the digital selector 157 selects the data from one of the sources and outputs the selected digital data to the DV data interface 152, to an MPEG encoder 158, or to the D/A conversion circuit 161. The digital selector 157 also outputs the selected digital data to a bridge 159.

The MPEG encoder 158 compresses the image and sound digital data from the digital selector 157 into MPEG-format digital data and outputs the compressed data to the bridge 159. The MPEG encoder 158 further converts a scene switchover image into a still image and outputs the resulting still image to the bridge 159.

The bridge 159 receives image and sound digital data (uncompressed data) from the digital selector 157 and outputs the received data to the CRT 140 through the PCI bus 136 and interface 137 of the personal computer 11 in which the image processing board 144 is incorporated. The bridge 159 also receives image and sound digital data in MPEG format from the MPEG encoder 158 and outputs the received data to the HDD 141 or to the CPU 131 via the PCI bus 136 of the personal computer 11 incorporating the board 144. Furthermore, the bridge 159 receives image and sound digital data in MPEG format from the HDD 141 of the personal computer 11 through the PCI bus 136 and outputs the received data to the MPEG decoder 160.

The MPEG decoder 160 decompresses MPEG-format image and sound digital data from the bridge 159 and outputs the decompressed data to the digital selector 157.

The D/A conversion circuit 161 converts image and sound digital data from the digital selector 157 to analog format and outputs the resulting analog signals to the analog selector 155.

The processes executed by the MPEG encoder 158 and MPEG decoder 160 may alternatively be implemented by the CPU 131 using suitable programs.

The structure of the EPG server 10 and that of the personal computer 16 will not be described further; the structure is the same as that of the personal computer 11 in FIG. 11 excluding the speakers 143 and image processing board 144.

Figure 13:
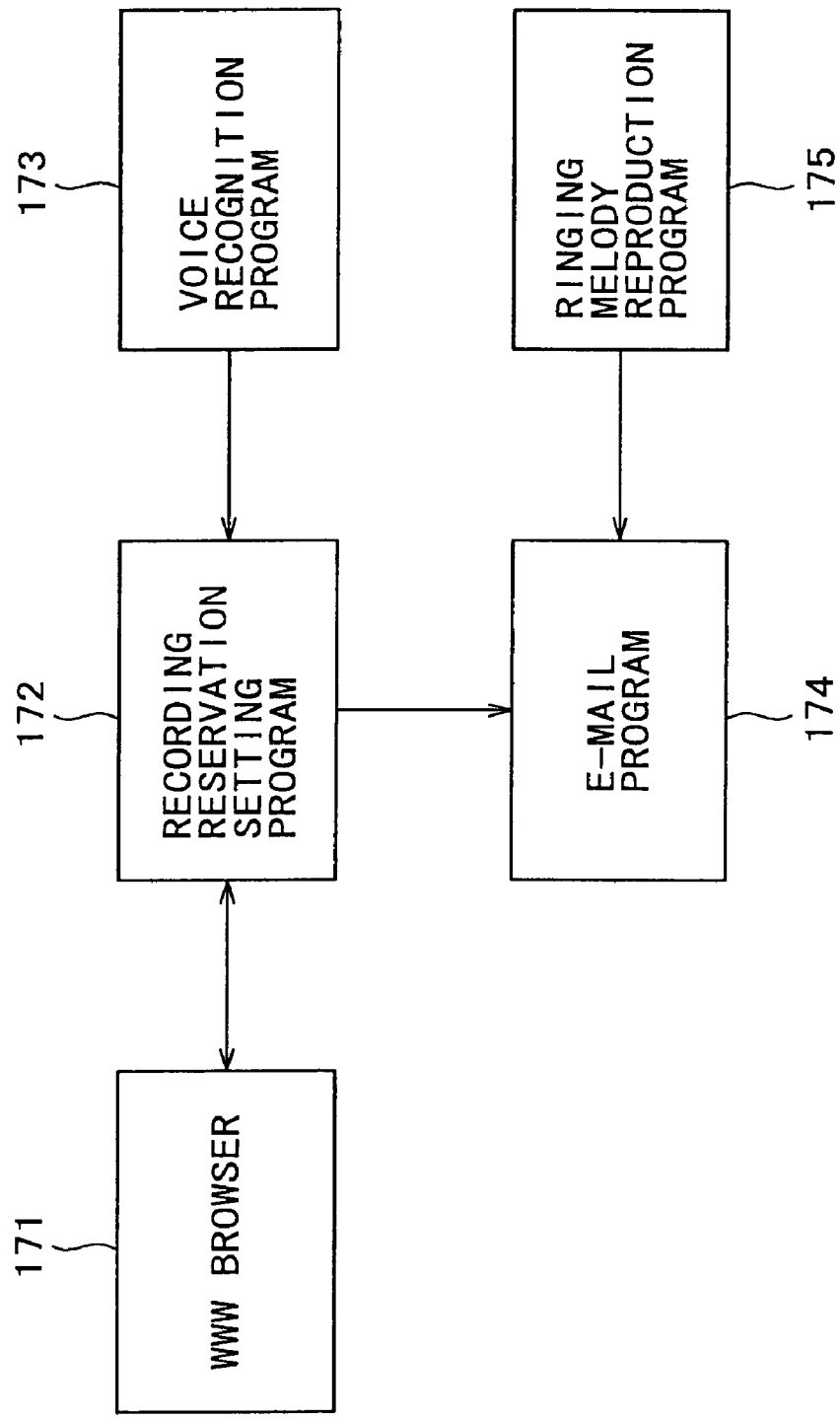
FIG. 13 is an explanatory view of application programs retained in the camera-equipped digital mobile telephone.

FIG. 13 is an explanatory view of application programs retained in the camera-equipped digital mobile telephone 1 having what is known as the i-mode (registered trademark) capability.

In keeping with appropriate protocols such as HTTP, a WWW browser 171 gains access to simple-format websites established by the EPG server 10 offering EPG information (TV listings, i.e., information about the TV programs scheduled to be broadcast). The established connection allows the WWW browser 171 to receive compact HTML files over the Internet 8 and displays images reflecting the received files.

A recording reservation setting program 172 sets recording reservations based on the EPG information that is received and displayed by the WWW browser 171. The settings involve reserving desired TV programs from particular TV stations for subsequent unattended recording.

A voice recognition program 173 recognizes voices that are input by the user wishing to set recording reservations by use of the microphone 43. The result of the recognition by the program 173 is sent to the recording reservation setting program 172.

An e-mail program 174 requests the access server 6 to forward e-mails addressed to this mobile telephone. The self-addressed e-mails are downloaded by the e-mail program 174. The e-mail program 174 also requests the access server 6 to send e-mails to their destinations.

A ringing melody reproduction program 175 permits associating desired music files with the mail addresses of registered senders who may send e-mails. When an e-mail from one of the registered senders is received, the ringing melody reproduction program 175 automatically reproduces the music file corresponding to the sender.

Figure 14:
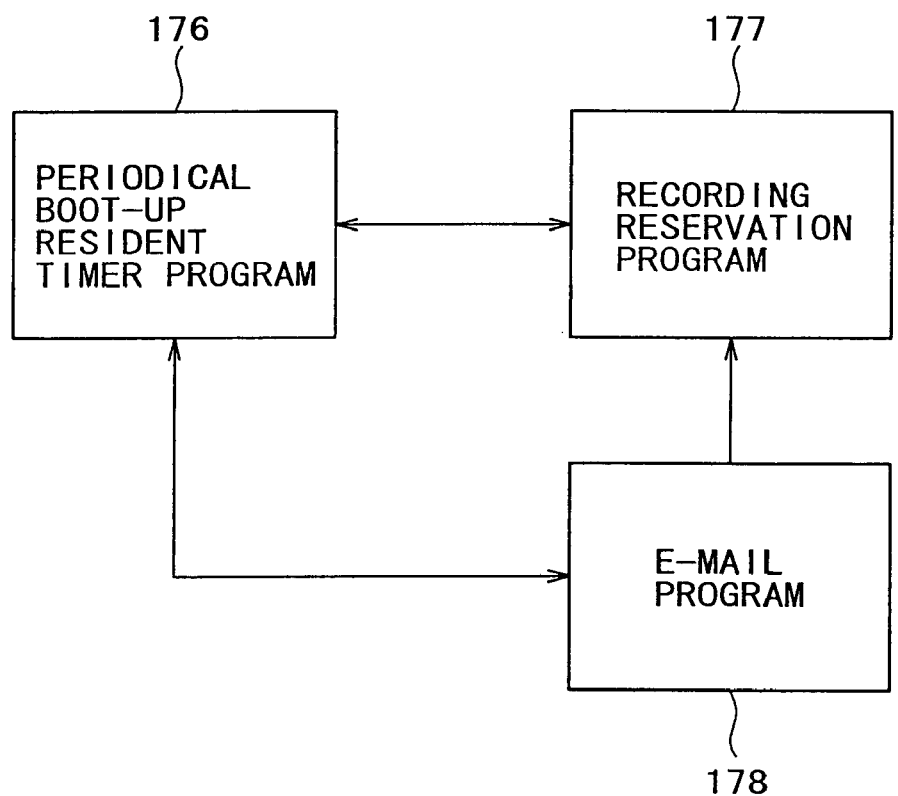
FIG. 14 is an explanatory view of application programs held in the personal computer.

FIG. 14 is an explanatory view of application programs held in the personal computer 11. A periodical boot-up resident timer program 176 is a program that automatically checks to see if any e-mail addressed to this PC has arrived. The periodical boot-up resident timer program 176 periodically boots the operating system while the personal computer 11 is being turned off, and proceeds to boot a recording reservation program 177 and an e-mail program 178.

The recording reservation program 177 is booted in response to a boot-up request from the periodical boot-up resident timer program 176. Based on the recording reservation data attached to the incoming e-mail from the e-mail program 178, the recording reservation program 177 reserves a specific TV program for subsequent unattended recording.

The e-mail program 178 is also booted in response to a boot-up request from the periodical boot-up resident timer program 176. In operation, the e-mail program 178 requests the access server 6 to forward e-mails addressed to this personal computer. The self-addressed e-mails are downloaded by the e-mail program 178. The e-mail program 178 also requests the access server 6 to send e-mails to their destinations.

How the above-described first embodiment of this invention works will now be described. With the embodiment in operation, the camera-equipped digital mobile telephone 1 is used to reserve a desired TV program for unattended recording and to request the EPG server 10 to send a reservation mail (i.e., an e-mail with an attachment of recording reservation data). Given the transmission request, the EPG server 10 sends the e-mail along with the attachment of the recording reservation data (i.e., reservation mail) to the personal computer 11 via the Internet 8, access server 6, and public switched network 4, and the unattended recording is executed.

Described below in detail is how the camera-equipped digital mobile telephone 1 is operated to set an unattended recording reservation with regard to the personal computer 11 at a remote location (i.e., the user's household).

When the user away from home decides to reserve a particular TV program for unattended recording, the user first enters a specific key command using the operation keys 41 on the camera-equipped digital mobile telephone 1. The user's operation boots the WWW browser 171.

In turn, the main control unit 61 of the camera-equipped digital mobile telephone 1 running the WWW browser 171 receives a compact HTML file offered by the EPG server 10 over the Internet 8. With the file received, the main control unit 61 displays on the liquid crystal display 35 a TV program information screen (top page) as shown in FIG. 15.

Figure 15:
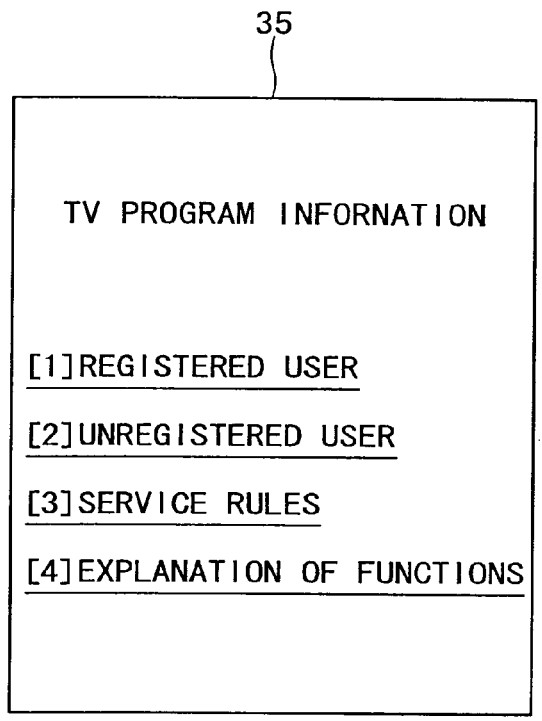
FIG. 15 is a schematic view of a TV program information screen.

The TV program information screen in FIG. 15 indicates four categories: registered user, unregistered user, service rules, and explanation of functions. The "registered user" category may be selected by the user who has registered to receive the recording reservation service. The "unregistered user" category is selected by the user who has yet to register so as to receive the recording reservation service. The "service rules" category is selected if it is desired to look up the rules for the recording reservation service. The "explanation of functions" category is selected by the user wishing to read explanations of various functions regarding the recording reservation service.

Illustratively, the user may rotate the jog dial 44 to highlight the "unregistered user" indication in the TV program information screen on the liquid crystal display 35. With the "unregistered user" indication highlighted, pressing the jog dial 44 into the body 23 selects the highlighted category. The selection boots the recording reservation setting program 172 and displays a registration screen, not shown, in which the unregistered user can make registration entries preparatory to receiving the recording reservation service. Specifically, the unregistered user may enter into the registration screen such user information as the user's name, password, e-mail address of the mobile telephone, e-mail address at the location for unattended recording reservation (i.e., user's household), and user's birthday. Entering the relevant information allows the user to acquire from the EPG server 10 a unique user ID granting the right to receive the recording reservation service.

In another example, the user may select the "registered user" category by operating the jog dial 44. In this case, the recording reservation setting program 172 is booted and the EPG server 10 is requested to provide the recording reservation service. The main control unit 61 running the recording reservation setting program 172 receives a compact HTML file from the EPG server 10 over the Internet 8, and displays on the liquid crystal display 35 a log-in screen as shown in FIG. 16.

Figure 16:
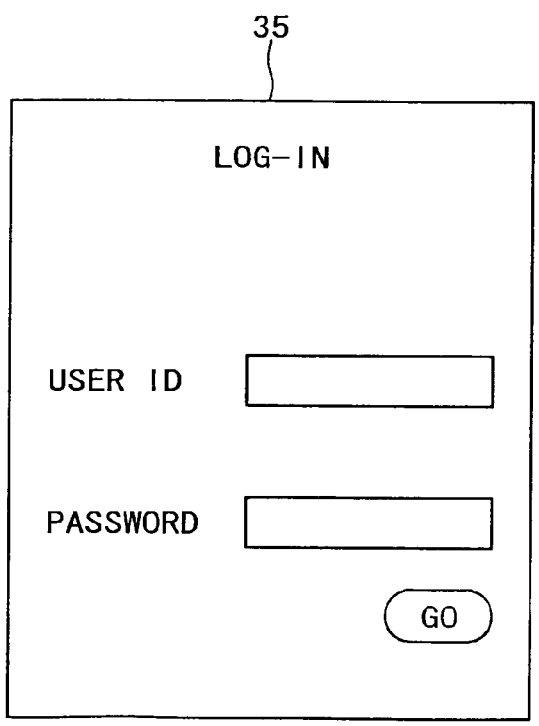
FIG. 16 is a schematic view of a log-in screen.

The log-in screen in FIG. 16 indicates fields into which to enter a user ID and a password. The registered user enters his or her user ID and password into the respective fields and selects a button named "GO." This causes the user information (i.e., user ID and password) to be sent to the EPG server 10. Based on the transmitted user information, the EPG server 10 looks up from storage the relevant e-mail address of the camera-equipped digital mobile telephone 1 and e-mail address of the personal computer 11 in the user's household.

After log-on to the recording reservation service, the main control unit 61 receives another compact HTML file from the EPG server 10 and displays on the liquid crystal display 35 a region selection screen as shown in FIG. 17.

The region selection screen in FIG. 17 indicates five regions in Japan: Hokkaido, Kanto, Chubu, Kansai, and Fukuoka. Selecting any one of the displayed regions permits subsequent display of TV program information corresponding to the selected region. If a particular region was previously selected during the user registration process, it is possible to skip the display of the region selection screen.

For example, suppose now that the user operates the jog dial 44 to select the "Kanto" region in the TV program information screen on the liquid crystal display 35. In this case, the main control unit 61 receives another compact HTML file from the EPG server 10 and displays on the liquid crystal display 35 a category selection screen as shown in FIG. 18.

The category selection screen in FIG. 18 indicates four categories: today's programs, tomorrow's programs, service rules, and explanation of functions. The "today's programs" category is selected when it is desired to look up information about the TV programs scheduled to be broadcast this day. The "tomorrow's programs" category is selected by the user wishing to look up information about the TV programs scheduled to be broadcast the next day. The "service rules" category is selected where the rules for the recording reservation service are to be looked up. The "explanation of functions" category is selected if the user wants to read explanations of various functions regarding the recording reservation service.

Illustratively, the user may operate the jog dial 44 to select the "tomorrow's programs" category in the category selection screen on the liquid crystal display 35. The selection causes the main control unit 61 to receive another compact HTML file from the EPG server 10 and displays on the liquid crystal display 35 a category selection screen regarding the "tomorrow's programs" category as shown in FIG. 19.

The category selection screen in FIG. 19 indicates eight subordinate categories about the "tomorrow's programs" category: movies, dramas, sports, music, variety shows, living and hobbies, city news, and culture. Any one of the eight categories may be selected by the user wishing to look up information about those TV programs in the selected category which are scheduled to be broadcast the next day.

For example, suppose that the user operates the jog dial 44 to select the "sports" category in the category selection screen on the liquid crystal display 35. In this case, the main control unit 61 receives another compact HTML file from the EPG server 10 and displays on the liquid crystal display 35 a category selection screen applicable to the "sports" category as shown in FIG. 20.

The category selection screen in FIG. 20 indicates a number of subordinate categories regarding the "sports" category, including "Olympic Games 07:55," "Olympic Games 08:35," "news 10:00," and "profession baseball 19:00." The "Olympic Games 07:55" category is selected in order to look up information about the Olympic Games-related programs to be broadcast starting at 7:55 in the morning; the "Olympic Games 08:35" category is selected so as to look up information about the Olympic Games-related programs to be broadcast starting at 8:35 in the morning; the "news 10:00" category is selected if the user wants to look up information about the news programs to be broadcast starting at 10:00 in the morning; and the "professional baseball 19:00" category is selected where it is desired to look up information about the professional baseball-related programs starting at 7:00 in the evening.

Illustratively, the user may proceed to operate the jog dial 44 so as to select the "professional baseball 19:00" category in the category selection screen on the liquid crystal display 35. The selection causes the main control unit 61 to receive another compact HTML file from the EPG server 10 and displays on the liquid crystal display 35 a TV program information screen regarding professional baseball as shown in FIG. 21.

The TV program information screen shown in FIG. 21 displays detailed TV program information about the currently selected "professional baseball" category. Illustratively, suppose that the user checks the detailed program information about the "professional baseball" category in FIG. 21 in order to reserve the displayed TV program for unattended recording. In such a case, the user selects a button indicated as "Reserve iEPG." The selection causes the main control unit 61 to request the EPG server 10 to send relevant recording reservation data to the designated destination (i.e., to the personal computer 11 in the user's household in this example).

Given the transmission request, the EPG server 10 searches the EPG information database, not shown, for the recording reservation data designed to reserve the requested TV program, attaches the retrieved reservation data to an e-mail, and sends the e-mail thus prepared to the personal computer 11 through the Internet 8, access server 6, and public switched network 4.

FIG. 22 is a schematic view of an example of unattended recording reservation data. The recording reservation data are composed of text data. The first line "Subject: TVPI200006021900" in the recording reservation data constitutes a control command for executing unattended recording. The second line "Content-type:application/x-tv-program-info;charset-shift_jis" represents recording reservation data. The fourth line following a description "station:" contains data for specifying a TV channel whose program is to be recorded. Illustratively in FIG. 22, the fourth line "station: Nihon TV (trademark)" designates Nihon TV whose program is to be reserved for unattended recording.

At the same time, the fifth through the eighth lines in the recording reservation data describe data for specifying the date and time at which to start recording. The ninth line describes data for designating a recording stop time.

The recording reservation data for unattended recording according to this invention are described in what is known as a TVPI (Television Program-Info) format. In the description that follows, a set of recording reservation data will be referred to as a TVPI file where appropriate.

As will be described later, on receiving an e-mail from the EPG server 10, the personal computer 11 writes to the HDD 141 recording reservation data (FIG. 22) attached to the received e-mail and makes an unattended recording reservation based on the received recording reservation data. When the recording reservation is completed, the personal computer 11 sends a message (e-mail) announcing the completion to the camera-equipped digital mobile telephone. If the mobile telephone 1 has the mail address of the personal computer 11 associated beforehand with a music file of a desired ringing melody, the arrival of an e-mail from the personal computer 11 is announced by that melody to the mobile telephone user.

How a desired ringing melody is reproduced upon receipt of an e-mail will now be described. The user boots the ringing melody reproduction program 175 by inputting an appropriate key command using the operation keys 41 of the camera-equipped digital mobile telephone 1. This prompts the main control unit 61 of the mobile telephone 1 executing the ringing melody reproduction program 175 to display a screen for setting a reservation complete announcement melody on the liquid crystal display 35, as shown in FIG. 23.

The melody setting screen in FIG. 23 indicates a number of choices: Melody_A, Melody_B, Melody_C, Melody_1, Melody_2, and Melody_3.

Illustratively, suppose that the user selects "Melody_A" in the melody setting screen using the jog dial 44. In such a case, the music file of the selected melody is brought into correspondence with a previously defined destination (e-mail address of the personal computer 11 in the user's household in this example). The corresponding music file is stored into the Memory Stick 51.

Upon receipt of an e-mail from the personal computer 11, the main control unit 61 executing the ringing melody reproduction program 175 extracts header information from the received e-mail, retrieves from the Memory Stick 51 the music file corresponding to the e-mail address of the sender in the header information, and outputs the retrieved file to the speaker 34.

As described, where the camera-equipped digital mobile telephone 1 has a desired music file associated in advance with the e-mail address of the personal computer 11, the previously established ringing melody announces the arrival (i.e., reception) of a message from the personal computer 11 saying that unattended recording reservation is now complete.

Figure 24:
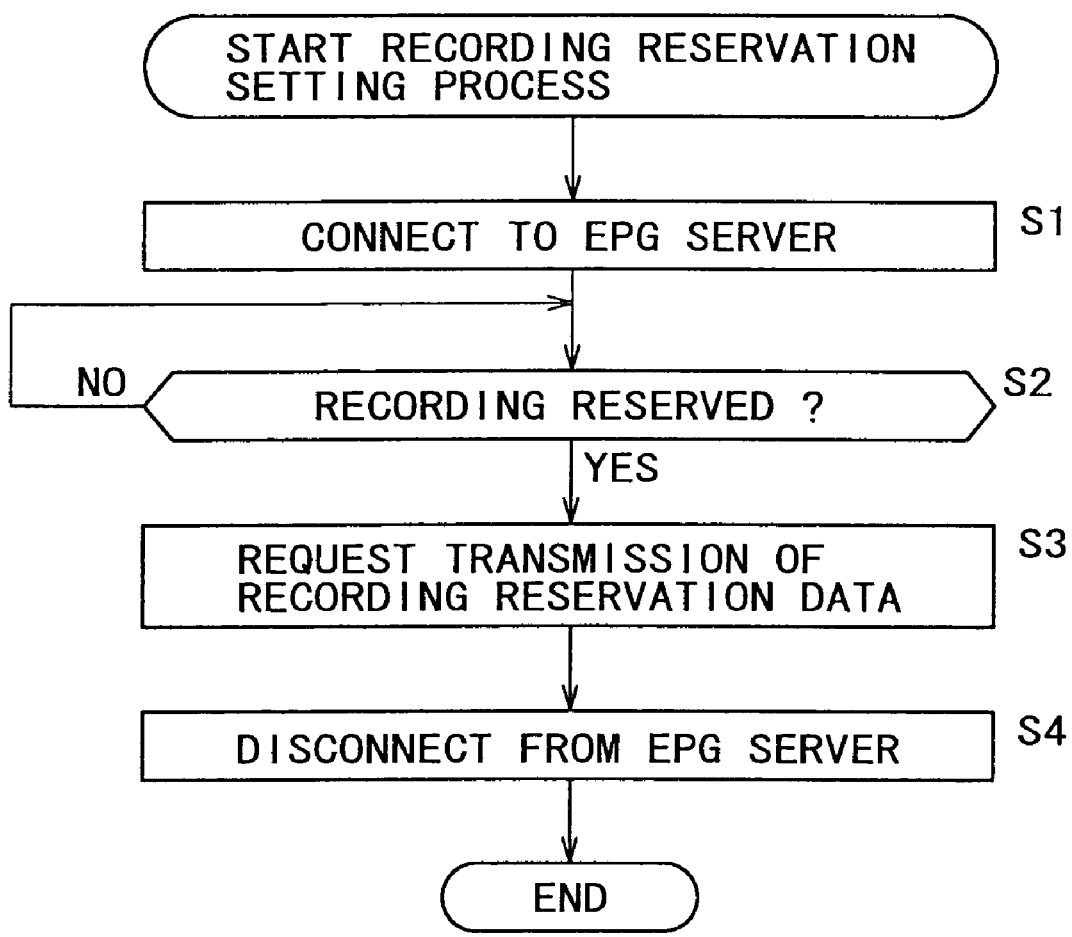
FIG. 24 is a flowchart of steps constituting a recording reservation setting process.

Described below with reference to the flowchart of FIG. 24 is how an unattended recording reservation is carried out by the camera-equipped digital mobile telephone 1. In step S1, the main control unit 61 of the mobile telephone 1 executing the recording reservation setting program 172 connects to the EPG server 10 over the Internet 8. In step S2, the main control unit 61 judges whether the user has reserved unattended recording of a given TV program. The main control unit 61 waits for such a recording reservation to be made.

When a given TV program is judged reserved for unattended recording in step S2, step S3 is reached. In step S3, the main control unit 61 requests the EPG server 10 to send an e-mail to the personal computer 11 together with an attachment of data denoting the recording reservation that has just been established. In step S4, the main control unit 61 disconnects from the EPG server 10 and terminates the process.

Figure 25:
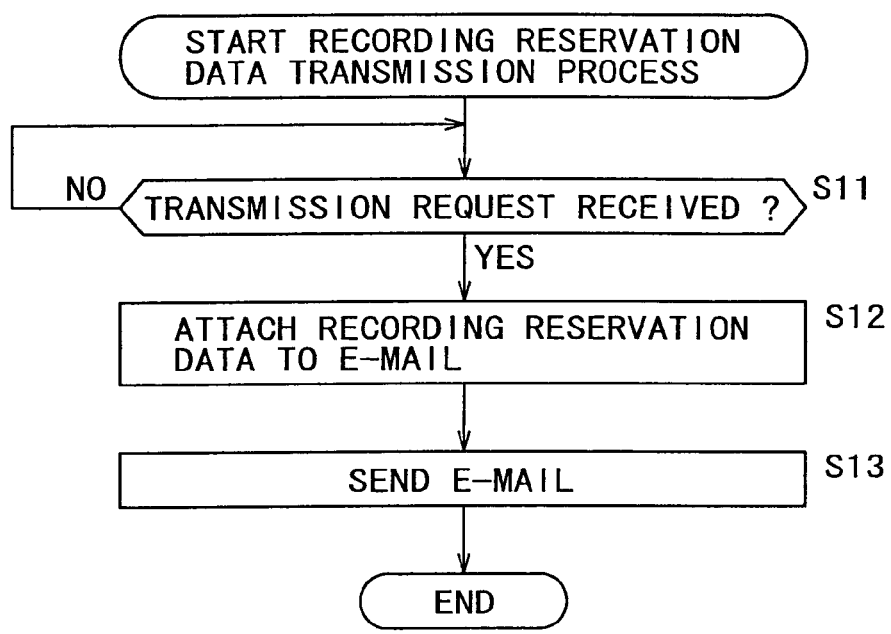
FIG. 25 is a flowchart of steps constituting a recording reservation data transmission process.

Described below with reference to the flowchart of FIG. 25 is how the EPG server 10 attaches recording reservation data to an e-mail so as to send the e-mail together with the attachment to the personal computer 11.

In step S11, the CPU (not shown) of the EPG server 10 judges whether a request is received from the camera-equipped digital mobile telephone 1 for sending recording reservation data. The CPU waits for such a recording reservation data transmission request to be received.

Figure 26:
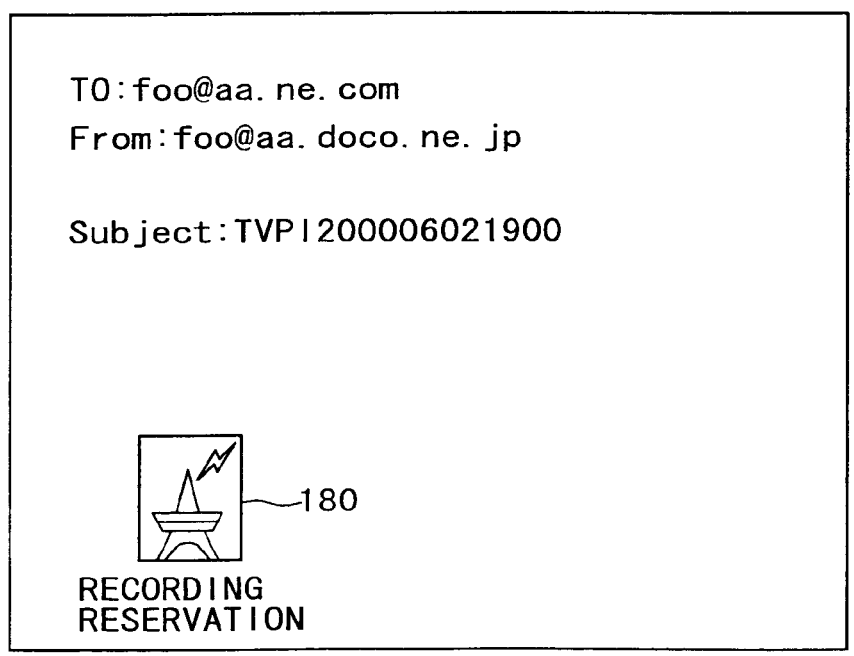
FIG. 26 is a schematic view of an e-mail screen.

When the recording reservation data transmission request is judged received in step S11, step S12 is reached. In step S12, the CPU of the EPG server 10 attaches the recording reservation data (FIG. 22) to an e-mail. Illustratively, as shown in FIG. 26 and based on the user's operations, the EPG server 10 describes an e-mail destination address such as "foo@aa.ne.com" (of the personal computer 11) following "TO:," an e-mail sender address "foo@aa.doco.ne.jp" (of the camera-equipped digital mobile telephone 1 following "FROM:," data "TVPI200006021900" following "Subject:," and an icon 180, in order to make up the e-mail. The icon 180 indicates that actual data "TVPI200006021900" (FIG. 22) are attached to the e-mail. The numeric characters following "TVPI" denote the start date and start time (i.e., at 19:00 on Jun. 2, 2000) of unattended recording.

In step S13, the CPU of the EPG server 10 sends the e-mail together with the recording reservation data attached in step S11 to the personal computer 11 via the Internet 8, access server 6, and public switched network 4, and terminates the process.

Figure 27:
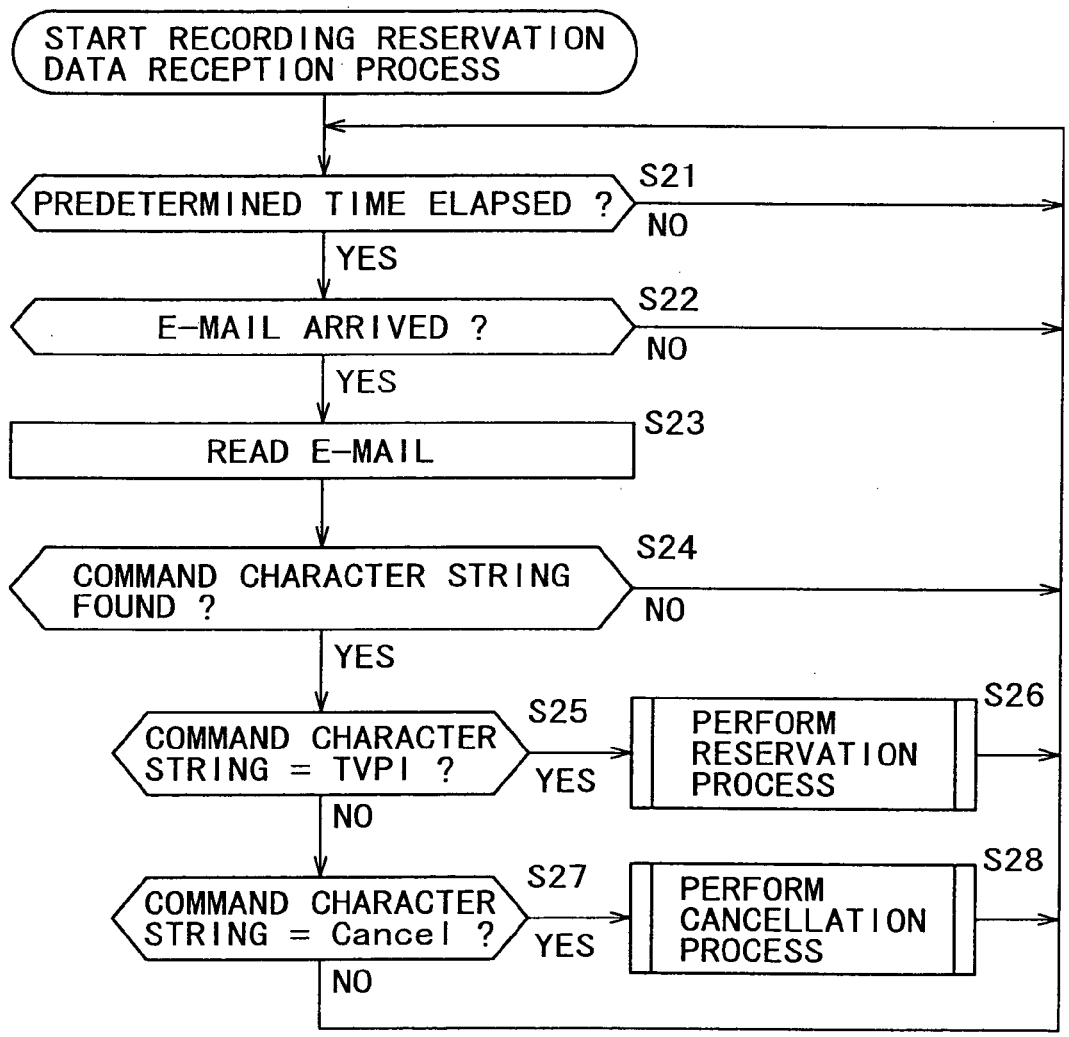
FIG. 27 is a flowchart of steps constituting a recording reservation data reception process.

Described below with reference to the flowchart of FIG. 27 is how the personal computer 11 receives and processes recording reservation data. In step S21, the CPU 131 of the personal computer 11 executing the periodical boot-up resident timer program 176 judges whether a predetermined time period (e.g., 10 minutes) has elapsed. The CPU 131 waits for the predetermined time to elapse. When the predetermined time is judged to have elapsed in step S21, step S22 is reached. In step S22, the CPU 131 boots the operating system from its turned-off state before booting the recording reservation program 177 and e-mail program 178. The CPU 131 executing the e-mail program 178 outputs a suitable control signal to the communication board 145 in order to call up the access server 6 through the public switched network 4 to see if any e-mail (such as that shown in FIG. 26) addressed to the personal computer 11 has arrived.

If in step S22 no e-mail addressed to the personal computer 11 is judged to have arrived, step S21 is reached again and the subsequent steps are repeated. When an e-mail addressed to the personal computer 11 is judged to have arrived in step S22, step S23 is reached. In step S23, the CPU 131 reads the e-mail from the access server 6 via the public switched network 4 and communication board 145, and stores into the RAM 133 the recording reservation data (TVPI file) attached to the e-mail.

In step S24, the CPU 131 executing the recording reservation program 177 retrieves from the RAM 133 the recording reservation data placed there in step S23, and judges whether the data include a command character string containing a control command. If the e-mail is not judged to include a command character string containing a control command, step S21 is reached again and the subsequent steps are repeated.

If in step S24 the e-mail is judged to include a command character string containing a control command, then step S25 is reached. In step S25, the CPU 131 judges whether the command character string is "TVPI."

If in step S25 the command character string is judged to be "TVPI" (in the example of FIG. 22, the command character string is "TVPI200006021900"), step S26 is reached. In step S26, the CPU 131 performs a reservation process.

More detailed steps constituting the reservation process above will now be described by referring to the flowchart of FIG. 28. In step S41, the CPU 131 executing the recording reservation program 177 judges whether the settings (parameters) in the command character string "TVPI" are normal, i.e., whether any recording reservation data (TVPI file) previously established and recorded on the hard disc drive 141 do not overlap in part with the recording time of the recording reservation data received this time.

If in step S41 the settings are judged normal (i.e., the recording times dot not overlap), then step S42 is reached. In step S42, the CPU 131 extracts the parameters from the recording reservation data (TVPI file).

The parameters extracted from the TVPI file include data for determining a TV channel whose program is to be recorded. The data are allowed to be described ambiguously within a predetermined range. Illustratively, the parameters are converted to data for designating a specific TV channel (i.e., TV station) in a process using a channel conversion file, as shown in FIG. 29.

The channel conversion file illustratively includes a character string "4, 0, 0, 4, Nihon TV, Nihon TV, Nittele, Nihon TV Broadcasting Network (trademarks), NTV." In this character string, the leftmost numeric character "4" specifies a channel number; the numeric character "4" on the right of the third comma from left denotes a channel number indication; the character string "Nihon TV" on the right of the fourth comma from left denotes a channel name indication; and the character strings on the right of the fifth comma from left ("Nihon TV, Nittele, Nihon TV Broadcasting Network, NTV," delimited by commas) ensure a match of the channel data with an applicable character string in the channel conversion file.

For example, if the fourth line in the recording reservation data has a description "station: Nihon TV," then the recording reservation program 177 judges whether the character string "Nihon TV" following "station:" matches the character string on the right of the fifth comma from left in the channel conversion file.

As shown in FIG. 29, where the channel conversion file contains the character string "4, 0, 0, 4, Nihon TV, Nihon TV, Nittele, Nihon TV Broadcasting Network, NTV," the recording reservation program 177 judges that the character string "Nihon TV" (on the right of the fifth comma from left) has matched one of the character strings in the channel conversion file.

When the character string in the recording reservation data is judged to match the relevant character string in the channel conversion file, the recording reservation program 177 establishes as the designated channel the data for determining the channel in the same row as the matched character string in the channel conversion file.

As a result, where the character string for designating the TV channel in the recording reservation data is any one of "Nihon TV," "Nittele," "Nihon TV Broadcasting Network" and "NTV," the recording reservation program 177 sets the channel to "4" based on the recording reservation data.

As described, even if the character string for specifying the channel in the recording reservation data are somewhat ambiguous, the recording reservation program 177 can still establish an appropriate channel on the basis of the recording reservation data.

Figure 28:
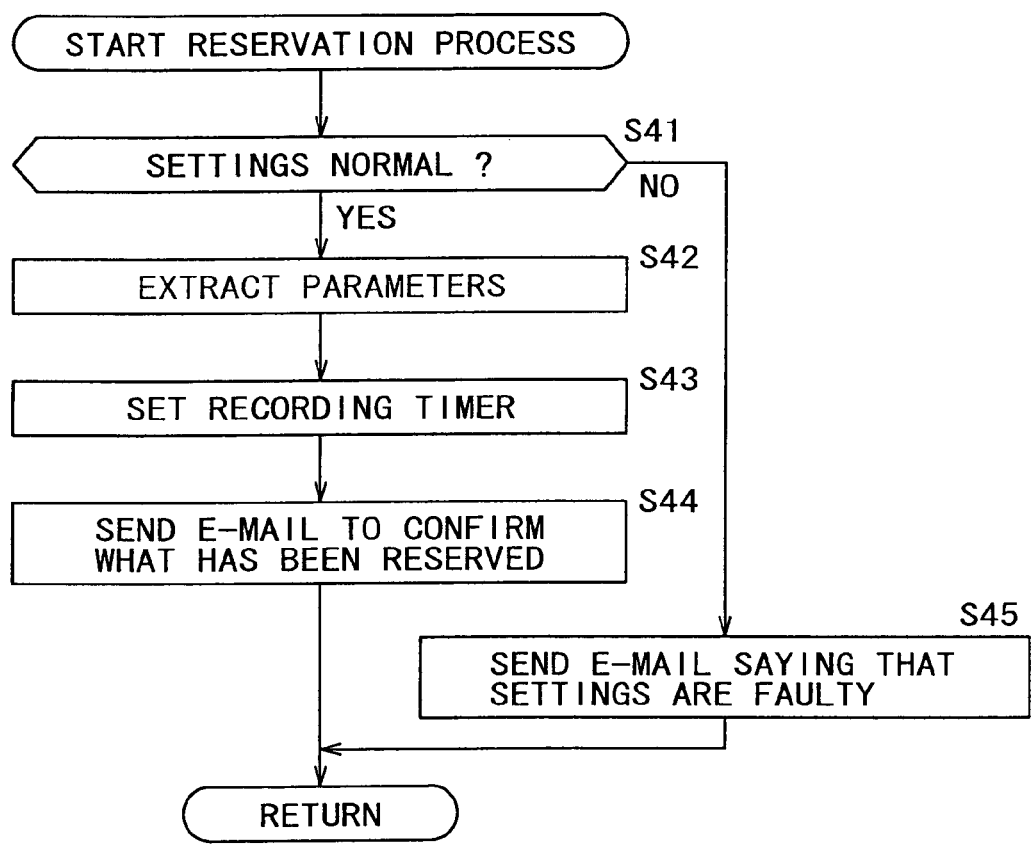
FIG. 28 is a flowchart of detailed steps constituting the reservation process.

Returning to step S43 in FIG. 28, the CPU 131 writes to the hard disc drive 141 the parameters extracted in step S42, and starts up a recording timer.

In step S44, the CPU 131 prepares an e-mail such as one shown in FIG. 30 to ask the mobile telephone user to confirm what has been reserved for unattended recording. The e-mail thus prepared is sent to the camera-equipped digital mobile telephone 1 through the communication board 145 and over the public switched network 4.

The e-mail shown in FIG. 30 describes a message saying "The recording reservation now complete. Reservation No.: 2." The e-mail may describe not only the message reporting the completion of a recording reservation, but also such information as the program name, recording start time, recording stop time, and recording mode. The user of the mobile telephone 1 having received the e-mail gets to know that the recording reservation is now complete.

Returning to step S41 in FIG. 28, if the settings are not judged normal, i.e., if any previously established recording reservation data are found to overlap in part with the recording time in the recording reservation data received this time, then step S45 is reached. In step S45, the CPU 131 prepares an e-mail such as one in FIG. 31 so as to ask the mobile telephone user to confirm that the settings are faulty. The e-mail thus prepared is sent to the camera-equipped digital mobile telephone 1 through the communication board 145 and over the public switched network 4.

The e-mail shown in FIG. 31 has a message saying that "Data for reservation No. 1 overlap in part with existing data on recording times. Reservation is impossible." The e-mail may contain not only the message reporting the inability to reserve a desired TV program but also a description of such information as the previously reserved TV program name together with its recording start time and recording stop time. The user of the camera-equipped digital mobile telephone 1 having received the e-mail comes to know that the desired recording reservation is not available.

Again in FIG. 28, control is returned from step S44 or S45 to step S26 in FIG. 27. From step S26, step S21 is reached once more and the subsequent steps are repeated.

If in step S25 the command character string is not judged to be "TVPI," then step S27 is reached. In step S27, the CPU 131 judges whether the command character string is "Cancel."

If in step S27 the command character string is judged to be "Cancel," then step S28 is reached. In step S28, the CPU 131 performs a cancellation process.

Detailed steps of the cancellation process above will now be described by referring to the flowchart of FIG. 32.

In step S61, the CPU 131 executing the recording reservation program 177 judges whether the designated recording reservation data exist, i.e., whether the recording reservation data in question are stored on the hard disc drive 141. If the specified recording reservation data are judged to exist, step S62 is reached.

In step S62, the CPU 131 deletes the designated recording reservation data from the hard disc drive 141. In step S63, the CPU 131 prepares an e-mail such as one shown in FIG. 33 in order to notify the mobile telephone user that the recording reservation data have been deleted. The e-mail is sent to the camera-equipped digital mobile telephone 1 through the communication board 145 and over the public switched network 4.

The e-mail shown in FIG. 33 comprises a message saying that "The recording reservation is deleted. Reservation No.: 2." The e-mail may include not only the message reporting the deletion of the recording reservation but also a description of such information as the TV program name along with the recording start time, recording stop time and recording mode reserved for recording. The user of the camera-equipped digital mobile telephone 1 having received the e-mail comes to know that the recording reservation data with reservation No. 2 have been deleted.

Figure 32:
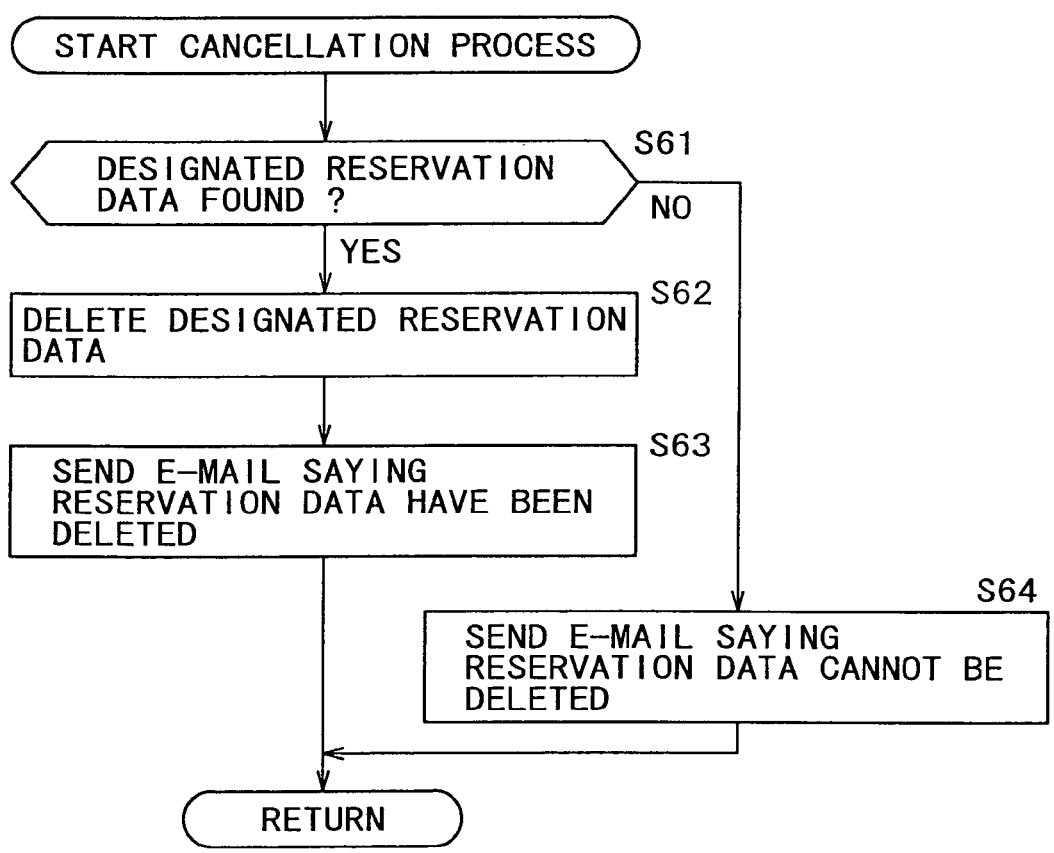
FIG. 32 is a flowchart of detailed steps constituting a cancellation process.

Returning to step S61 in FIG. 32, if the designated recording reservation data are not judged to exist, then step S64 is reached. In step S64, the CPU 131 prepares an e-mail such as one shown in FIG. 34 in order to inform the mobile telephone user that the specified recording reservation data cannot be deleted. The e-mail is sent to the camera-equipped digital mobile telephone 1 through the communication board 145 and over the public switched network 4.

The e-mail shown in FIG. 34 includes a message saying that "Reservation No. 1 is not found and the reservation data cannot be deleted." The e-mail may contain not only the message reporting the inability to delete the recording reservation data but also a description of such information as the name of the specified TV program name. The user of the camera-equipped digital mobile telephone 1 having received the e-mail comes to know that the recording reservation data with reservation No. 2 could not be deleted.

Again in step S32, control is returned from step S63 or S64 to step S28 in FIG. 27. From step S28, step S21 is reached once more and the subsequent steps are repeated.

As described, the personal computer 11 automatically carries out a recording reservation based on the recording reservation data attached to an incoming e-mail.

Figure 35:
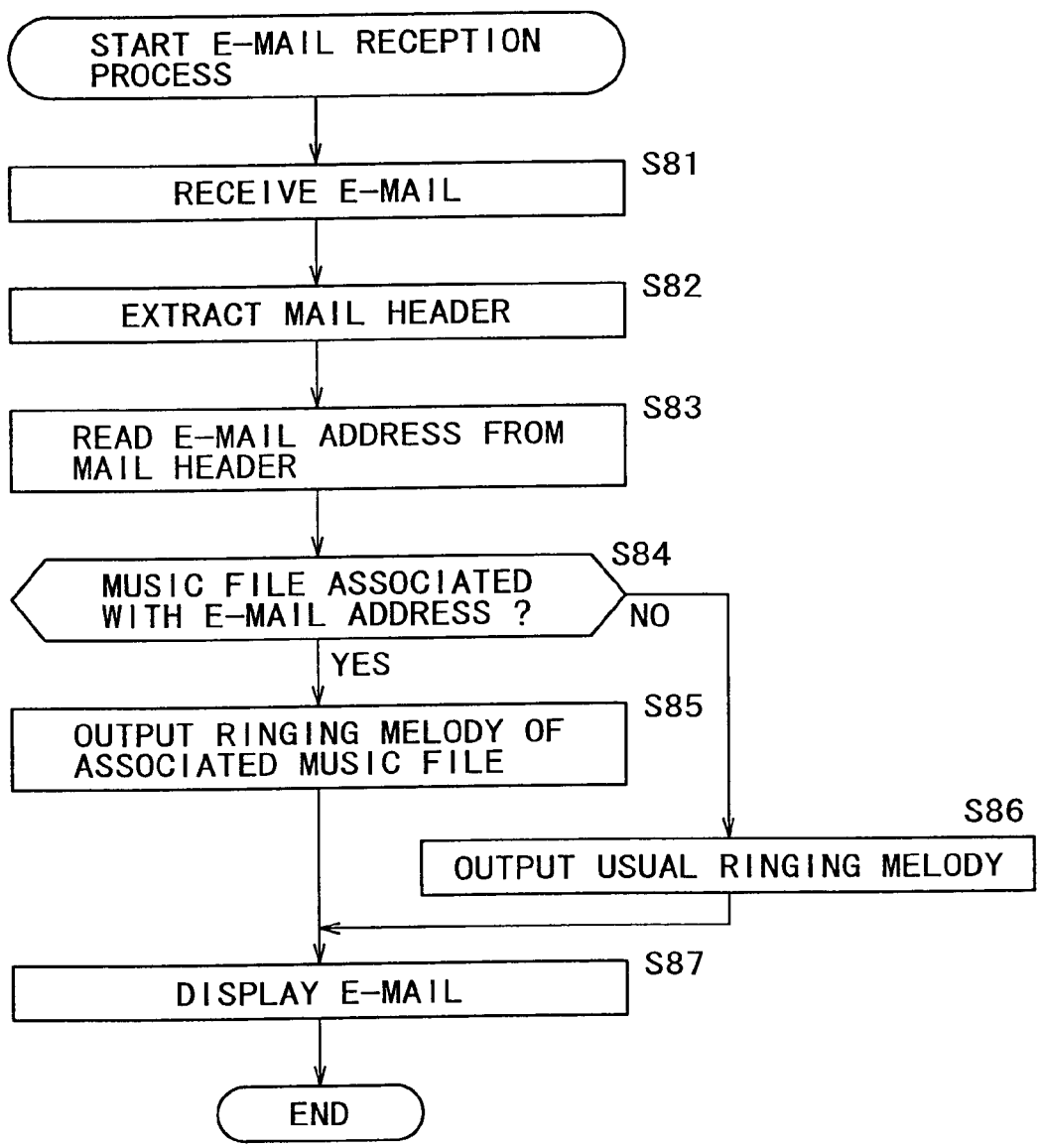
FIG. 35 is a flowchart of steps constituting an e-mail reception process.

Described below with reference to the flowchart of FIG. 35 is an e-mail reception process performed by the camera-equipped digital mobile telephone 1. In step S81, the main control unit 61 of the mobile telephone 1 executing the e-mail program 174 receives an e-mail addressed to the telephone user (e.g., e-mail shown in FIG. 30). In step S82, the main control unit 61 extracts mail header information from the e-mail received in step S81.

In step S83, the main control unit 61 reads the sender's e-mail address ("foo@aa.ne.com" in this case) from the e-mail header information extracted in step S82. In step S84, the main control unit 61 judges whether a music file is associated with the e-mail address retrieved in step S83, i.e., the unit 61 determines by referencing the Memory Stick 51 whether the e-mail address read in step S83 is stored there and whether the e-mail address is associated with any music file.

If in step S84 the e-mail address is judged associated with a music file, step S85 is reached. In step S85, the main control unit 61 retrieves from the Memory Stick 51 a music file "Melody_A" (shown in FIG. 23) associated with the e-mail address and outputs the retrieved file to the audio codec 70. The audio codec 70 converts the input music file into an analog signal and causes the speaker 34 to output a sound (ringing melody) corresponding to that analog signal.

If in step S84, the e-mail address is not judged associated with any music file, then step S86 is reached. In step S86, the main control unit 61 causes the speaker 34 to output a predetermined usual sound (ringing melody).

Step S85 or S86 is followed by step S87 in which the main control unit 61 causes the liquid crystal display 35 to display the received e-mail (FIG. 30). This terminates the process.

As described, the user of the camera-equipped digital mobile telephone 1 can verify by an incoming e-mail whether the recording reservation has been completed by the personal computer 11. Before receiving an e-mail from the personal computer 11, the mobile telephone user may associate a desired music file with the e-mail address of the PC 11. This allows the mobile telephone 1 to output a different ringing melody from the usual one upon receipt of an e-mail, unmistakably informing the user that the incoming e-mail is about the recording reservation.

Furthermore, the personal computer 11 may send to the camera-equipped digital mobile telephone 1 not only the e-mail ascertaining the completion of the recording reservation but also another e-mail (not shown), illustratively 30 minutes before the recording start time of the reserved TV program in question, saying that "The recording of reservation No. 1 starts in 30 minutes." The second e-mail allows the user to reconfirm the recording reservation, and if necessary, to cancel the reservation at this point.

Described below with reference to the flowchart of FIG. 36 is a recording process carried out by the personal computer 11. In step S91, the CPU 131 of the personal computer 11 executing the recording reservation program 177 reads the recording reservation data (TVPI file) from the hard disc drive 141. In step S92, the CPU 131 reads the current time from an RTC (real time clock), not shown.

In step S93, the CPU 131 compares the recording start time included in the recording reservation data read in step S91, with the current time read in step S92, to determine whether to start recording the reserved program.

If it is determined in step S93 to start the recording, step S94 is reached. In step S94, the CPU 131 starts recording the reserved program.

Illustratively, if the recording reservation data retrieved in step S91 are the data shown in FIG. 22, then the CPU 131 orders the tuner 154 to select "Channel 4." The tuner 154 admits RF signals from the antenna 12 and outputs image and sound analog signals on the designated channel (i.e., channel 4 in this case) to the VCR 13 through the analog selector 155. In turn, the VCR 13 records the supplied image and sound signals onto a video cassette, loaded but not shown.

In step S95, the CPU 131 reads the current time from the RTC, not shown. In step S96, the CPU 131 compares the current time with the recording stop time included in the recording reservation data retrieved from the hard disc drive 141, in order to determine whether to stop the recording.

If it is determined in step S96 that the recording is yet to be stopped, step S94 is reached again and the subsequent steps are repeated.

If in step S96 it is determined that the recording is to be stopped, then step S97 is reached in which the recording is terminated. Thereafter control is returned to step S91 and the subsequent steps are repeated.

As described, the personal computer 11 receives an e-mail together with an attachment of recording reservation data and stores the received recording reservation data onto the hard disc drive 141. The recording reservation data thus stored permit the personal computer 11 automatically to perform unattended recording of the reserved program.

Figure 38:
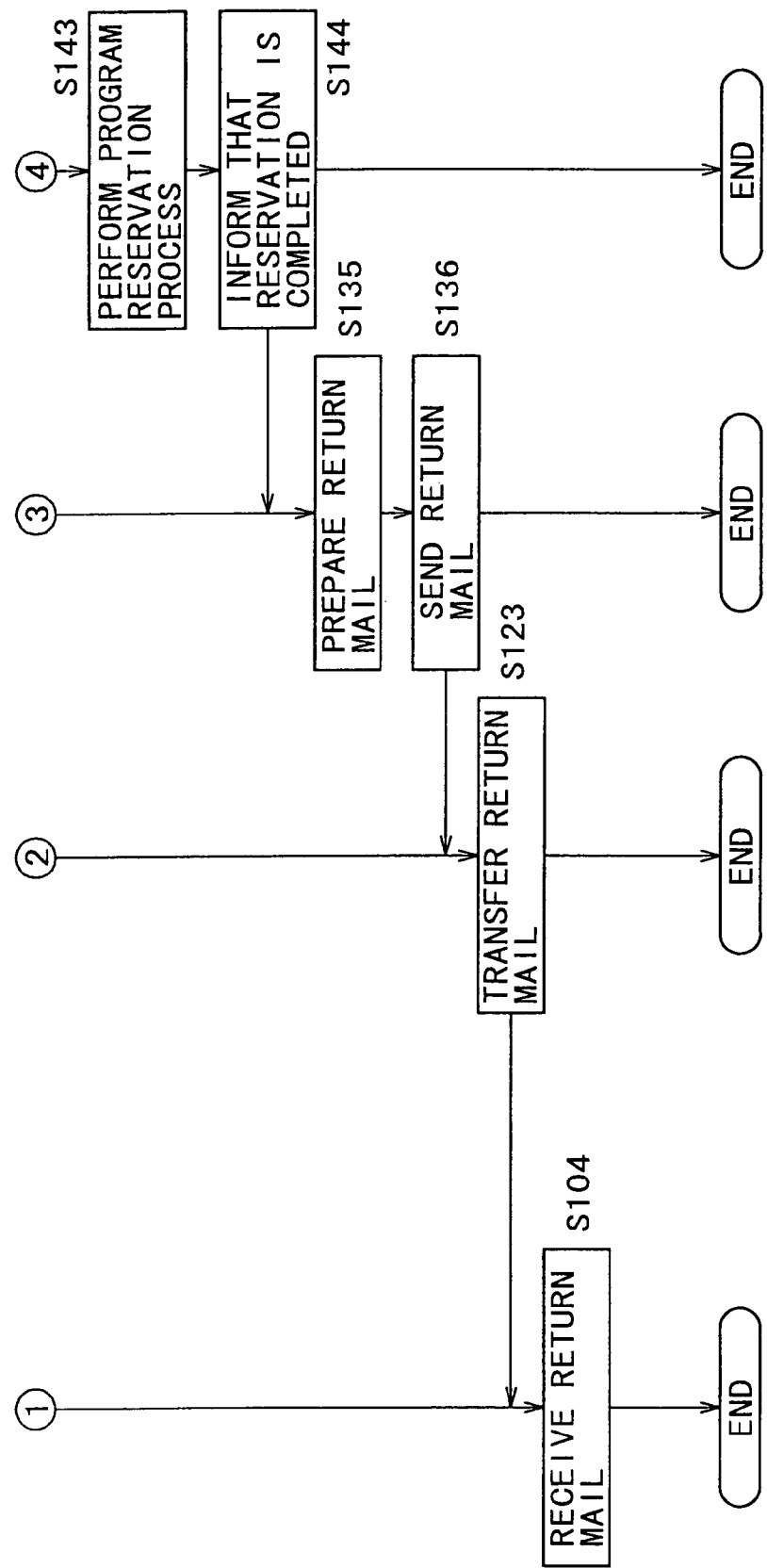
FIG. 38 is a flowchart continued from FIG. 37.

The steps carried out as described above by the devices involved are summarized in mutually associated fashion in FIGS. 37 and 38. Described below with reference to the flowcharts of FIGS. 37 and 38 is a reservation process performed by an image recording system as a whole according to the invention.

In step S101, the main control unit 61 of the camera-equipped digital mobile telephone 1 executing the recording reservation setting program 172 gains access to the EPG server 10 via the Internet 8.

In step S110, the CPU (not shown) of the EPG server 10 when accessed by the mobile telephone 1 distributes a top page (FIG. 15) to the telephone 1.

In step S102, the camera-equipped digital mobile telephone 1 receives entries of a user ID and a password from the user into a log-in screen (FIG. 16) that appears upon selection of, say, the "Registered user" category in the top page of FIG. 15. Information about the user who has thus logged in is sent to the EPG server 10.

In step S111, the EPG server 10 determines both the e-mail address of a reservation source (i.e., camera-equipped digital mobile telephone 1) and the e-mail address of a reservation destination (i.e., personal computer 11) based on the user information that has arrived from the mobile telephone 1.

In step S103, the main control unit 61 of the camera-equipped digital mobile telephone 1 allows the user to reserve a desired TV program for unattended recording. When the recording reservation is set (e.g., by the user selecting a button indicated as "Reserve by iEPG" on the TV program information screen of FIG. 21), the main control unit 61 requests the EPG server 10 to send the recording reservation data to the designated reservation destination.

In step S112, in response to the transmission request from the camera-equipped digital mobile telephone 1, the EPG server 10 searches the EPG information database (not shown) for the recording reservation data (FIG. 22) about a particular TV program of a specific TV station, retrieves the applicable recording reservation data, and prepares an e-mail (reservation mail) together with an attachment of the retrieved reservation data. In step S113, the EPG server 10 sends the reservation mail (i.e., e-mail with the recording reservation data attached) prepared in step S112 to the access server 6 over the Internet 8.

In step S121, the CPU (not shown) of the access server 6 receives the reservation mail from the EPG server 10 and stores the received mail onto that mail spool on the HDD (hard disc drive) which is allocated to the reservation destination (i.e., personal computer 11).

In step S131, the CPU 131 of the personal computer 11 executing the periodical boot-up resident timer program 176 boots the OS from its deactivated state upon elapse of a predetermined time period before booting the e-mail program 178. In step S132, the CPU 131 executing the e-mail program 178 calls up the access server 6 to check whether any e-mail addressed to the PC 11 (e.g., e-mail shown in FIG. 26) has arrived.

In step S122, the access server 6 when accessed by the personal computer 11 transfers to the PC 11 the reservation mail (i.e., e-mail with the recording reservation attached) that was placed on the mail spool in step S121.

In step S133, the CPU 131 of the personal computer 11 executing the e-mail program 178 receives the reservation mail from the access server 6 and interprets the received e-mail. The CPU 131 extracts the recording reservation data (TVPI file) from the e-mail. In step S134, the CPU 131 exports (i.e., writes) the data format of the TVPI file extracted in step S133 to a data format that can be read by the recording reservation program 177.

In step S141, the CPU 131 of the personal computer 11 executing the periodical boot-up resident timer program 176 boots the OS from its deactivated state upon elapse of a predetermined time period before booting the recording reservation program 177. In step S142, the CPU 131 executing the recording reservation program 177 imports the TVPI file that has been exported from the e-mail program 178.

In step S143, the CPU 131 executing the recording reservation program 177 carries out a reservation process of the TV program to be recorded unattended. The reservation process is the same as step S21 through S23 in the flowchart of FIG. 28 and thus will not be described further. In step S144, the CPU 131 executing the recording reservation program 177 informs the e-mail program 178 that the reservation has been completed.

In step S135 of FIG. 38, the CPU 131 executing the e-mail program 178 is informed of the completion of the reservation by the recording reservation program 177 and prepares a return mail (FIG. 30) containing a message saying that the recording reservation is now complete. In step S136, the CPU 131 executing the e-mail program 178 sends the return mail prepared in step S135 to the access server 6 over the Internet 8.

In step S123, the CPU (not shown) of the access server 6 transfers to the camera-equipped digital mobile telephone 1 the return mail sent from the personal computer 11.

In step S104, the main control unit 61 of the mobile telephone 1 executing the e-mail program 174 receives the return mail transferred through the access server 6. Upon receipt of the return mail, the camera-equipped digital mobile telephone 1 displays the content of the mail on the liquid crystal display 35. By looking at the display (of the return mail), the user is able to know that the recording reservation is completed.

As described, the user away from home carrying the camera-equipped digital mobile telephone 1 may wish to have a desired TV program reserved remotely for unattended recording by the personal computer 11 in the user's household. In such a case, the user makes necessary settings of a recording reservation by having recourse to the recording reservation service offered by the EPG server 10. The EPG server 10 is requested to send the settings constituting the recording reservation data. Given the transmission request, the EPG server 10 sends to the personal computer 11 an e-mail with an attachment of the recording reservation data thus prepared. On receiving the e-mail, the personal computer 11 can make the recording reservation based on the recording reservation data attached to the e-mail.

In the foregoing description, the user away from home was shown using his or her camera-equipped digital mobile telephone 1 to have a desired TV program reserved remotely for unattended recording by the personal computer 11 in the user's household. However, the mobile telephone-based reservation is not limitative of the invention. Alternatively, any of the personal computer 16 set up inside corporations may be used to have a desired recording reservation made by the personal computer 11 in the user's household.

What follows is a description of a second embodiment of this invention wherein the personal computer 16 is used to have a recording reservation made by the personal computer 11 in the user's household. With the second embodiment in operation, the user employs the personal computer 16 to make an unattended recording reservation of a desired TV program. The personal computer 16 then requests the EPG server 10 to send the reservation mail. Given the transmission request, the EPG server 10 sends an e-mail with an attachment of the recording reservation data via the Internet 8, access server 6, and public switched network 4 to the personal computer 11 for recording reservation.

How the personal computer 16 is used to have a desired recording reservation established by the remotely located personal computer 11 (in the user's household) is explained more specifically below. It is assumed that the application programs held by the personal computer 16 are the same as those possessed by the camera-equipped digital mobile telephone 1, discussed earlier with reference to FIG. 13.

Suppose now that the user, who has completed the user registration to make use of the recording reservation service, wants to reserve a desired TV program for unattended recording from inside the corporation he or she works for. In that case, the user operates the keyboard and mouse (both not shown) of the personal computer 16 to enter a predetermined key command for booting the WWW browser 171.

The personal computer 16 executing the WWW browser 171 then receives an HTML file from the EPG server 10 via the Internet 8, and displays on a CRT (not shown) a TV program information screen (top page) as shown in FIG. 39.

Illustratively, the user selects a "Recording Reservation" button 181 on the TV program information screen. Selecting the button boots the recording reservation setting program 172 and requests the EPG server 10 to provide the recording reservation service. The personal computer 16 executing the recording reservation setting program 172 receives an HTML file from the EPG server 10 over the Internet 8 and gives on the CRT a display of TV listings such as those in FIG. 40 reflecting the received file. The TV listings include request buttons 191-1 through 191-11 that may be used to request recording reservation data for the corresponding TV programs.

For example, selecting the request button 191-1 causes the personal computer 16 to request the EPG server 10 to send to the designated destination the recording reservation data for "Seven O'clock news" on NHK (trademark) General; selecting the request button 191-2 has the personal computer 16 request the EPG server 10 to send to the designated destination the recording reservation data for "TV map" on NHK General; selecting the request button 191-3 has the personal computer 16 request the EPG server 10 to send to the designated destination the recording reservation data for "Drama" also on NHK General; selecting the request button 191-4 has the personal computer 16 request the EPG server 10 to send to the designated destination the recording reservation data for "Local weather forecasts" on NHK General.

Similarly, selecting any one of the request buttons 191-5 through 191-11 causes the personal computer 16 to request the EPG server 10 to send the recording reservation data for the corresponding TV program to the designated destination.

As described, when the user selects (i.e., clicks on) a desired TV program in the TV listings of FIG. 40, the personal computer 16 requests the EPG server 10 to send the recording reservation data for the selected program to the designated destination (i.e., personal computer 11 in this example). Upon receipt of the transmission request, the EPG server 10 searches the EPG information database (not shown) for the recording reservation data needed to reserve the desired TV program of a specific TV station, retrieves the applicable recording reservation data, attaches the retrieved recording reservation data to an e-mail, and sends the e-mail to the personal computer 11 together with the attachment. In turn, the personal computer 11 carries out a recording reservation based on the recording reservation data attached to the received e-mail.

On the personal computer 16, the e-mail address of the personal computer 11 may be associated in advance with a suitable music file. This allows the user of the personal computer 16 to know by a musical ring the arrival of an e-mail from the personal computer 11.

How a desired ringing melody is reproduced upon receipt of an e-mail will now be described. By operating the keyboard and/or the mouse (both not shown) of the personal computer 16, the user first enters a suitable key command to boot the ringing melody reproduction program 175. The personal computer 16 executing the ringing melody reproduction program 175 displays on the CRT, not shown, a ringing melody setting screen indicated in FIG. 41.

Figure 41:
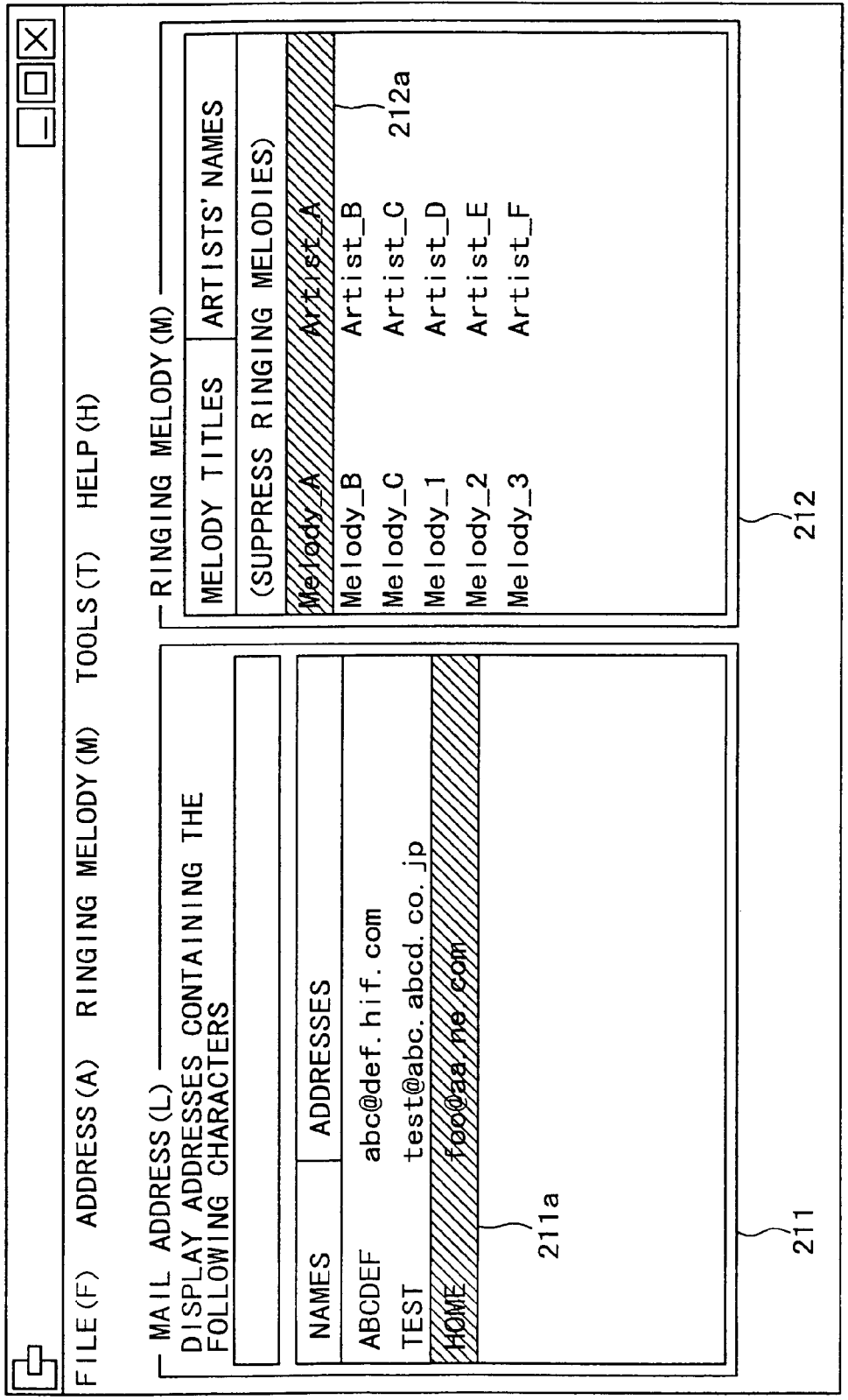
FIG. 41 is a schematic view of a ringing melody setting screen.

The ringing melody setting screen in FIG. 41 has a mail address display area 211 that shows a plurality of e-mail addresses representing senders who may send e-mails. The screen also has a selectable melody display area 212 that indicates a plurality of music file names associated with artist names, any of the music files being selectable for melody reproduction in correspondence with the e-mail address of a specific sender.

Illustratively, the user selects the desired e-mail address ("foo@aa.ne.com" in this example) by moving a cursor 211a up and down in the mail address display area 211 through the use of the mouse. Then in the selectable melody display area 212, the user similarly moves the cursor 212a up and down to select a music file (e.g., titled "Melody_A" with the artist name "Artist_A" in this case) that should correspond with the e-mail address chosen earlier.

The personal computer 16 executing the ringing melody reproduction program 175 stores onto a hard disc drive, not shown, the user-selected e-mail address in correspondence with the desired music file.

When an e-mail is received from the personal computer 11, the personal computer 16 executing the ringing melody reproduction program 175 extracts header information from the received e-mail, and retrieves from the hard disc drive the music file corresponding to the e-mail address of the sender included in the extracted header information. The retrieved music file is output to a speaker, not shown, for audio output.

As described, the personal computer 16 is arranged to retain beforehand in its storage a specific music file associated with the e-mail address of the personal computer 11. With this arrangement in place, the arrival of an e-mail message reporting either completion or unavailability of a recording reservation from the personal computer 11 is announced by the sound of the preset ringing melody.

The recording reservation setting process by the personal computer 16 is the same as that carried out by the camera-equipped digital mobile telephone 1 as discussed above with reference to the flowchart of FIG. 24, and thus will not be described further. The e-mail reception process by the personal computer 16 is the same as that performed by the mobile telephone 1 as explained above with reference to the flowchart of FIG. 35, and thus will not be described further.

It was shown above that the recording reservation data attached to the e-mail are described using a TVPI control command. However, this is not limitative of the invention. Alternatively, other predetermined control commands such as Typinfo control commands may be used instead.

It was also shown that the recording reservation is set by use of the camera-equipped digital mobile telephone 1 or the personal computer 16. Alternatively, the same process is carried out using the mobile telephone 1 and the PDA 2.

This invention is applied not only to the camera-equipped digital mobile telephone 1, PDA 2, and personal computer 16; but also to laptop personal computers; PHS (Personal Handyphone System) terminals, car navigation systems, and other devices which send and receive e-mails.

It was also shown above that a desired TV program is reserved for unattended recording by the user manipulating the operation keys 41 of the camera-equipped digital mobile telephone 1. Alternatively, recording reservation of the desired TV program may be carried out by the user's voice input.

Figure 42:
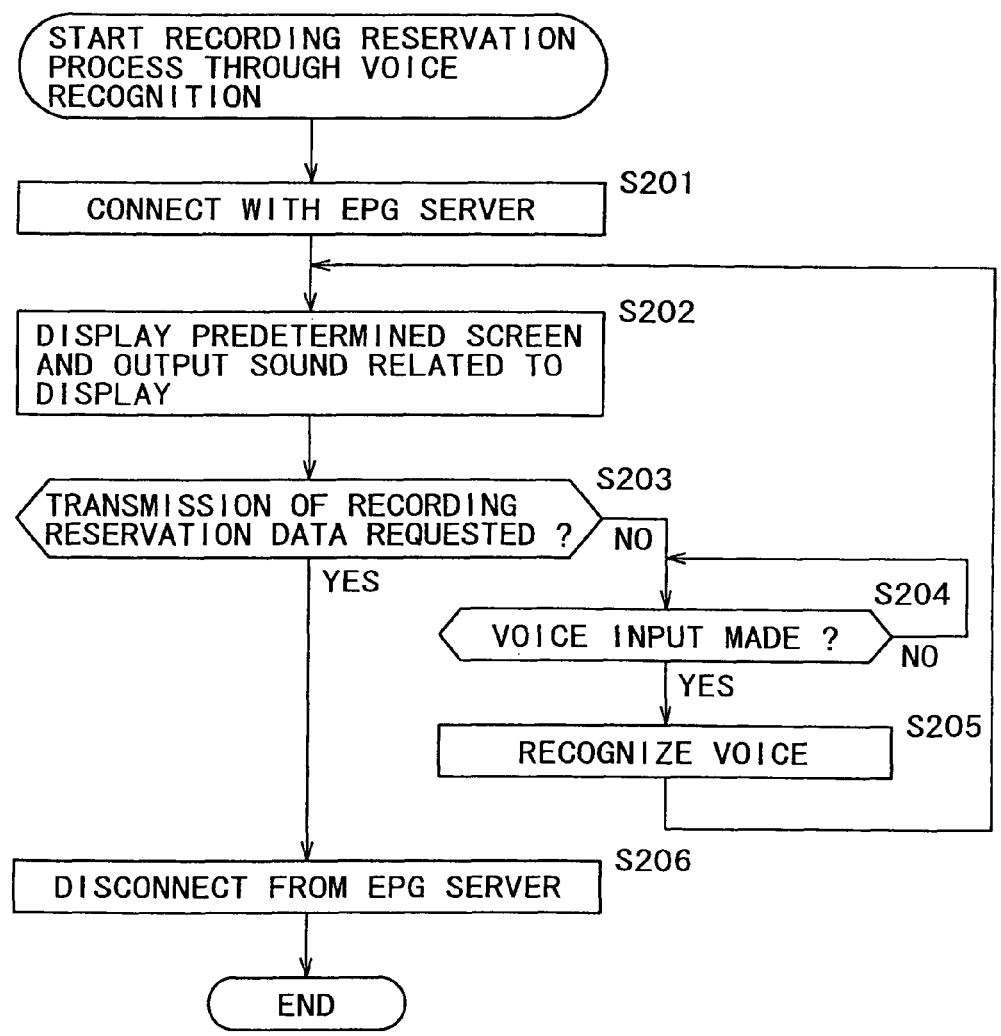
FIG. 42 is a flowchart of steps constituting a recording reservation process implemented through voice recognition.

Described below with reference to the flowchart of FIG. 42 is a recording reservation setting process performed through voice recognition. This process is initiated by the user manipulating the operation keys 41 of the camera-equipped digital mobile telephone 1 so as to enter a suitable key command to boot the WWW browser 171.

In step S201, the main control unit 61 of the mobile telephone 1 executing the WWW browser 171 establishes connection with the EPG server 10 via the Internet 8. In step S202, the main control unit 61 receives a compact HTML file from the EPG server 10 over the Internet 8, and displays a predetermined screen (TV program information screen of FIG. 15 in this example) reflecting the received file on the liquid crystal display 35. At the same time, the sound corresponding to the content of the file is fed to the speaker 34 for output.

Illustratively, the speaker 34 outputs a message like this: If you have already registered for the recording reservation service, please pronounce "registered user"; if you have yet to register for the recording reservation service, please say "unregistered user"; if you wish to know the rules of the service, please pronounce "service rules"; if you want explanations of various functions available with the recording reservation service, please say "explanation of functions."

In step S203, the main control unit 61 judges whether the user has requested for transmission of recording reservation data. If transmission of the recording reservation data is not judged to be requested, step S204 is reached.

In step S204, the main control unit 61 judges whether the user has made a voice input through the microphone 43. The step is repeated until a voice input is judged to be made.

If in step S204 the user is judged to have made a voice input (e.g., pronouncing "registered user"), step S205 is reached. In step S205, the main control unit 61 boots the voice recognition program 173 to recognize the voice entered in step S204. From step S205, control is returned to step S202.

In step S202, the main control unit 61 receives another compact HTML file from the EPG server 10 via the Internet 8, and displays a predetermined screen (log-in screen of FIG. 16 in this case) reflecting the received file on the liquid crystal display 35. At the same time, the sound corresponding to the content of the file is fed to the speaker 34 for output. This causes the speaker 34 to output an audio message, such as "Please pronounce your user ID and password."

If in step S203 the user is not judged to have requested the transmission of recording reservation data yet, then step S204 is reached. Step S204 is repeated until the main control unit 61 judges that the user has made a voice input through the microphone 43.

If in step S204 the user is judged to have made a voice input (e.g., illustratively pronouncing "My user ID is AAA; my password is BBB"), step S205 is reached. In step S205, the main control unit 61 boots the voice recognition program 173 to recognize the voice entered in step S204. From step S205, control is returned to step S202 and the subsequent steps are repeated.

In step S202, a predetermined screen (TV program information screen of FIG. 21 in this case) is displayed on the liquid crystal display 35 and the sound related to the content of the display is fed to the speaker 34 for output. Upon verifying the output sound, the user either selects the button indicated as "Reserve iEPG" by manipulating the operation keys 41, or makes a voice input by illustratively pronouncing "Reserve that program for recording." The selection or voice input constitutes a request for transmission of the recording reservation data.

If in step S203 the user is judged to have requested transmission of the recording reservation data, step S206 is reached. In step S206, the main control unit 61 disconnects from the EPG server 10.

Given the transmission request, the EPG server 10 searches the EPG information database (not shown) for the recording reservation data needed to reserve the desired TV program of a specific TV station, retrieves the applicable recording reservation data, attaches the retrieved recording reservation data to an e-mail, and sends the e-mail to the personal computer 11 together with the attachment.

As described, when the name of a particular TV program is input by voice, the recording reservation of the program in question can be made on an interactive basis. The ensuing processes are the same as those discussed above and thus will not be described further.

The voice recognition process above was shown carried out by the main control unit 61 of the camera-equipped digital mobile telephone 1 as depicted in FIGS. 13 and 42. Alternatively, the series of voice recognition steps may be executed by the EPG server 10 in FIG. 4 in order to alleviate the workload on the mobile telephone 1.

The series of steps described above may be executed either by hardware or by software. For software-based processing to take place, programs constituting the software may be either incorporated beforehand in dedicated hardware of a computer or installed upon use from a suitable program storage medium into a general-purpose personal computer or like equipment capable of executing diverse functions.

As shown in FIG. 10, computer-executable programs designed to perform the above-described processes when installed in a computer may be retained on such package media as the magnetic disc 121 (including flexible disks), optical disc 122 (including CD-ROM (compact disc-read only memory) and DVD (digital versatile disc)), magneto-optical disc 123 (including MD (Mini-Disc)), or semiconductor memory 124; or may be stored on the flash ROM 93 or the hard disc where the programs reside temporarily or permanently. The programs may be retained on these storage media after being transferred over wired or wireless communication media such as the public switched network 4, local area networks, the Internet 8, or digital satellite broadcasting networks via suitable interfaces such as routers and modems as needed.

In this specification, the steps which are stored on a program storage medium and which describe the programs to be executed represent not only the processes that are carried out in the depicted sequence (i.e., on a time series basis) but also processes that are conducted parallelly or individually.

In this specification, the term "system" refers to an entire configuration made up of a plurality of component devices.

Where the information processing apparatus according to another aspect of the invention is in use, an e-mail with control data attached thereto for controlling recording of a desired TV program for unattended recording is received from another information processing apparatus over the network. Recording of the desired TV program is then controlled by the information processing apparatus based on the control data attached to the e-mail received. This also permits easy and quick reservation of desired TV programs for unattended recording.

Where the program information providing apparatus according to the first aspect of the invention is in use, upon receipt of user information from the first information processing apparatus regarding its user, a first and a second e-mail address are determined from previously registered information. The first e-mail address corresponds to the first information processing apparatus as a destination to which a result of setting the unattended recording reservation is to be reported, and the second e-mail address corresponds to the second information processing apparatus on which the unattended recording reservation is to be set. If the first information processing apparatus requests by e-mail that control data be sent over the network to the second information processing apparatus, then an e-mail is prepared by attaching to it the control data retrieved from storage as designated by the user and the first e-mail address. The e-mail thus prepared is sent over the network to the second information processing apparatus. This permits easy and quick reservation of desired TV programs for unattended recording.

Where the image recording system according to the fourth aspect of the invention is in use, upon receipt of user information from the first information processing apparatus regarding its user, a first and a second e-mail address are determined from previously registered information. The first e-mail address corresponds to the first information processing apparatus as a destination to which a result of setting the unattended recording reservation is to be reported, and the second e-mail address corresponds to the second information processing apparatus on which the unattended recording reservation is to be set. If the first information processing apparatus requests by e-mail that control data be sent over the network to the second information processing apparatus, then an e-mail is prepared by attaching to it the control data retrieved from storage as designated by the user and the first e-mail address. The e-mail thus prepared is sent over the network to the second information processing apparatus. Given the e-mail, the second information processing apparatus controls unattended recording of the designated program. This permits easy and quick reservation of desired TV programs for unattended recording.

The invention claimed is:

1. A program information providing apparatus, comprising:
    means for storing control data for controlling reservation of a program for unattended recording;
    means for providing which, if a first information processing apparatus that requests an unattended recording reservation from a first location requests provision of program information about said program over a network, then provides said program information to said first information processing apparatus;
    means for determining which, based on user information sent from said first information processing apparatus regarding a user of said first information processing apparatus, determines a first and a second e-mail address from previously registered information, said first e-mail address corresponding to said first information processing apparatus as a destination to which a result of setting the unattended recording reservation is to be reported, said second e-mail address corresponding to a second information processing apparatus, located at a second location, on which said unattended recording reservation is to be set;
    means for preparing which, if said first information processing apparatus requests that said control data be sent over said network to said second information processing apparatus, then reads said control data, which is designated by said user of said first information processing apparatus, from said storing means before preparing a first e-mail by attaching to said first e-mail the retrieved control data and said first e-mail address determined by said determining means as representative of the destination to which the result of the setting of said unattended recording reservation is to be reported;

means for sending said first e-mail prepared by said preparing means to said second information processing apparatus corresponding to said second e-mail address; and said second information processing apparatus sends a second email to said first email address that reports the result of the setting of the unattended recording, and said result of setting the unattended recording reservation includes selected program information which indicates a name of the program.

2. A program information providing apparatus according to claim 1, wherein said control data include channel information, a recording start date, a recording start time, and a recording stop time.

3. A program information providing apparatus according to claim 1, wherein said control data are added to said first e-mail as an attachment.

4. A program information providing apparatus according to claim 1, wherein said control data arc described in a message of said first e-mail.

5. A program information providing apparatus according to claim 1, wherein said sending means attaches said control data to a general-purpose e-mail before sending said general-purpose e-mail together with the attached control data to second information processing apparatus over said network.

6. A program information providing apparatus according to claim 5, wherein said general-purpose e-mail can be sent and received over the Internet.

7. A program information providing apparatus according to claim 1, wherein said determining means determines said first and second e-mail addresses from said previously registered information that is stored in a user profile database which includes said first and second e-mail addresses.

8. A program information providing apparatus according to claim 1, wherein said result of setting said unattended recording reservation identifies a conflict with a previously scheduled reservation.

9. A program information providing apparatus according to claim 1, wherein said result of setting said unattended recording reservation includes a notification that said unattended recording reservation will begin in a predetermined amount of time.

10. A program information providing apparatus according to claim 1, wherein said result of setting the unattended recording reservation includes a method to cancel said recording reservation.

11. A program information providing apparatus according to claim 1, wherein said result of setting the unattended recording reservation including the selected program information also indicates the recording start time, recording stop time, and recording mode.

12. A program information providing method comprising:
storing control data for controlling reservation of a program for unattended recording;
if a first information processing apparatus that requests an unattended recording reservation from a first location requests provision of program information about said program over a network, then providing said program information to said first information processing apparatus;
based on user information sent from said first information processing apparatus regarding a user of said first information processing apparatus, determining a first and a second e-mail address from previously registered information, said first e-mail address corresponding to said first information processing apparatus as a destination to which a result of setting the unattended recording reservation is to be reported, said second e-mail address corresponding to a second information processing apparatus, located at a second location, on which said unattended recording reservation is to be set;
if said first information processing apparatus requests by e-mail that said control data be sent over said network to a second information processing apparatus, then reading said control data stored, designated by said user of said first information processing apparatus and stored in said storing step, before preparing a first e-mail by attaching to said first e-mail the retrieved control data and said first e-mail address determined in said determining step as representative of the destination to which the result of the setting of said unattended recording reservation is to be reported;
sending said first e-mail prepared in said preparing step over said network to said second information processing apparatus corresponding to said second e-mail address; and
sending, by said second information processing apparatus, a second email to said first email address that reports the result of the setting of the unattended recording, and said result of setting the unattended recording reservation includes selected program information which indicates a name of the program.

13. A non-transitory computer readable storage medium which stores a computer-readable program which when executed by a processor performs a method comprising:
storing control data for controlling reservation of a program for unattended recording;
if a first information processing apparatus that requests an unattended recording reservation from a first location requests provision of program information about said program over a network, then providing said program information to said first information processing apparatus;
based on user information sent from said first information processing apparatus regarding a user of said first information processing apparatus, determining a first and a second e-mail address from previously registered information, said first e-mail address corresponding to said first information processing apparatus as a destination to which a result of setting the unattended recording reservation is to be reported, said second e-mail address corresponding to a second information processing apparatus, located at a second location, on which said unattended recording reservation is to be set;
if said first information processing apparatus requests by e-mail that said control data be sent over said network to said second information processing apparatus, then reading said control data, designated by said user of said first information processing apparatus and stored in said storing step, before preparing a first e-mail by attaching to said first e-mail the retrieved control data and said first e-mail address determined in said determining step as representative of the destination to which the result of the setting of said unattended recording reservation is to be reported;
sending said first e-mail prepared in said preparing step over said network to said second information processing apparatus corresponding to said second e-mail address; and
sending, by said second information processing apparatus, a second email to said first email address that reports the result of the setting of the unattended recording, and said result of setting the unattended recording reservation includes selected program information which indicates a name of the program.

14. An image recording system, comprising:
a program information providing apparatus, a first information processing apparatus, located at a first location, and a second information processing apparatus, located at a second location, said program information providing apparatus providing over a network control data for controlling reservation of a program for unattended recording, said first information processing apparatus reserving said program for unattended recording, said second information processing apparatus recording said program in unattended fashion;
wherein said program information providing apparatus includes:
means for storing said control data;
means for determining which, based on user information sent from said first information processing apparatus regarding a user of said first information processing apparatus, determines a first and a second e-mail address from previously registered information, said first e-mail address corresponding to said first information processing apparatus as a destination to which a result of setting the unattended recording reservation is to be reported, said second e-mail address corresponding to said second information processing apparatus on which said unattended recording reservation is to be set;
means for preparing which, if said first information processing apparatus requests by e-mail that said control data be sent over said network to said second information processing apparatus, then reads said control data, which is designated by said user of said first information processing apparatus, from said storing means before preparing a first e-mail by attaching to said first e-mail the retrieved control data and said first e-mail address determined by said determining means as representative of the destination to which the result of the setting of said unattended recording reservation is to be reported; and
means for sending said first e-mail prepared by said preparing means over said network to said second information processing apparatus corresponding to said second e-mail address;
wherein said first information processing apparatus includes:
means for selecting display of program information provided by said program information providing apparatus over said network, before selecting said program from among the programs covered by said program information; and
means for requesting which, if said program is selected by said selecting means, then requests said program information providing apparatus to send said control data to said second information processing apparatus over said network; and wherein said second information processing apparatus includes:
means for receiving said first e-mail sent from said program information providing apparatus over said network;
recording controlling means for initially storing said control data attached to said first e-mail received by said receiving means, before controlling unattended recording of said program based on the stored control data; and
means for sending a second email to said first email address that reports the result of the setting of the unattended recording, and said result of setting the unattended recording reservation includes selected program information which indicates a name of the program.

15. A program information providing apparatus, comprising:
a storage unit configured to store control data for controlling reservation of a program for unattended recording;
a providing unit configured to, if a first information processing apparatus configured to request an unattended recording reservation from a first location requests provision of program information about said program over a network, provide said program information to said first information processing apparatus;
a determining unit configured to, based on user information sent from said first information processing apparatus regarding a user of said first information processing apparatus, determine a first and a second e-mail address from previously registered information, said first e-mail address corresponding to said first information processing apparatus as a destination to which a result of setting the unattended recording reservation is to be reported, said second e-mail address corresponding to a second information processing apparatus on which said unattended recording reservation is to be set;
a preparing unit configured to, if said first information processing apparatus requests by e-mail that said control data be sent over said network to said second information processing apparatus, read said control data, which is designated by said user of said first information processing apparatus, from said storage unit before preparing a first e-mail by attaching to said first e-mail the retrieved control data and said first e-mail address determined by said determining unit as representative of the destination to which the result of the setting of said unattended recording reservation is to be reported;
a sending unit configured to send said first c-mail prepared by said preparing unit over said network to said second information processing apparatus corresponding to said second e-mail address; and
said second information processing apparatus sends a second email to said first email address that reports the result of the setting of the unattended recording, and said result of setting the unattended recording reservation includes selected program information which indicates a name of the program.

* * * * *